US008660841B2

(12) United States Patent
Barzelay et al.

(10) Patent No.: US 8,660,841 B2
(45) Date of Patent: Feb. 25, 2014

(54) METHOD AND APPARATUS FOR THE USE OF CROSS MODAL ASSOCIATION TO ISOLATE INDIVIDUAL MEDIA SOURCES

(75) Inventors: Zohar Barzelay, Haifa (IL); Yoav Yosef Schechner, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 55 days.

(21) Appl. No.: 12/594,828

(22) PCT Filed: Apr. 6, 2008

(86) PCT No.: PCT/IL2008/000471
§ 371 (c)(1),
(2), (4) Date: Mar. 15, 2010

(87) PCT Pub. No.: WO2008/122974
PCT Pub. Date: Oct. 16, 2008

(65) Prior Publication Data

US 2010/0299144 A1 Nov. 25, 2010

Related U.S. Application Data

(60) Provisional application No. 60/907,536, filed on Apr. 6, 2007.

(51) Int. Cl.
*G10L 15/00* (2013.01)
*G10L 15/20* (2006.01)

(52) U.S. Cl.
USPC .................... 704/231; 704/233; 704/E15.042

(58) Field of Classification Search
USPC .......................................................... 704/233
See application file for complete search history.

(56) References Cited

U.S. PATENT DOCUMENTS

| | | | | |
|---|---|---|---|---|
| 6,219,639 | B1 * | 4/2001 | Bakis et al. | 704/246 |
| 6,816,836 | B2 * | 11/2004 | Basu et al. | 704/270 |
| 6,910,013 | B2 * | 6/2005 | Allegro et al. | 704/256 |
| 2002/0135618 | A1 * | 9/2002 | Maes et al. | 345/767 |
| 2003/0065655 | A1 * | 4/2003 | Syeda-Mahmood | 707/3 |
| 2004/0267536 | A1 * | 12/2004 | Hershey et al. | 704/276 |
| 2005/0251532 | A1 * | 11/2005 | Radhakrishnan et al. | 707/104.1 |
| 2006/0059120 | A1 * | 3/2006 | Xiong et al. | 707/3 |

(Continued)

OTHER PUBLICATIONS

Stauffer, C.: Automated audio-visual activity analysis, 2005, Tech. rep., MIT-CSAIL-TR-2005-057, Massachusetts Institute of Technology, Cambridge, MA.*

(Continued)

*Primary Examiner* — Richemond Dorvil
*Assistant Examiner* — Olujimi Adesanya

(57) ABSTRACT

Apparatus for isolation of a media stream of a first modality from a complex media source having at least two media modality, and multiple objects, and events, comprises: recording devices for the different modalities; an associator for associating between events recorded in said first modality and events recorded in said second modality, and providing an association output; and an isolator that uses the association output for isolating those events in the first mode correlating with events in the second mode associated with a predetermined object, thereby to isolate a isolated media stream associated with said predetermined object. Thus it is possible to identify events such as hand or mouth movements, and associate these with sounds, and then produce a filtered track of only those sounds associated with the events. In this way a particular speaker or musical instrument can be isolated from a complex scene.

14 Claims, 16 Drawing Sheets

(56) References Cited

U.S. PATENT DOCUMENTS

| | | | | |
|---|---|---|---|---|
| 2006/0075422 | A1* | 4/2006 | Choi et al. | 725/18 |
| 2006/0235694 | A1* | 10/2006 | Cross et al. | 704/270.1 |
| 2008/0193016 | A1* | 8/2008 | Lim et al. | 382/190 |

OTHER PUBLICATIONS

Chen et al, "Relating audio-visual events caused by multiple movements: in the case of entire object movement,", Jul. 2002, Information Fusion, 2002. Proceedings of the Fifth International Conference on , vol. 1, No., pp. 213-219 vol. 1, 8-11.*

Barzelay et al, "Harmony in Motion,", Jun. 2007 Computer Vision and Pattern Recognition, 2007. CVPR '07. IEEE Conference on , vol., No., pp. 1,8, 17-22.*

International Preliminary Report on Patentability Dated Oct. 15, 2009 From the International Bureau of WIPO Re.: Application No. PCT/IL2008/000471.

International Search Report and the Written Opinion Dated Aug. 27, 2008 From the International Searching Authority Re.: Application No. PCT/IL2008/000471.

Gianluca et al. "Analysis of Multimodal Sequences Using Geometric Video Representations", Signal Processing, XP002489312, 86(12): 3534-3548, Fig.5, Dec. 2006.

Jinji et al. "Finding Correspondence Between Visual and Auditory Events Based on Perceptual Grouping Laws Across Different Modalities", 2000 IEEE International Conference on Nashville, XP010523409,W 1: 242-247, Figs.1-3, table 1, Oct. 2000.

Jinji et al. "Relating Audio-Visual Events Caused by Multiple Movements: in the Case of Entire Object Movement", Information Fusion, Proceedings of the Fifth International Conference, XP010595122, 1: 213-219, Jul. 2002.

Zhu et al. "Major Cast Detection in Video Using Both Audio and Visual Information", IEEE International Conference on Acoustics, Speech, and Signal Processing, XP010803152, 3: 1413-1416, Fig 1, May 2001.

Zohar et al. "Harmony in Motion", CCIT Technical Report 620, XP002491034, Apr. 2007.

* cited by examiner

METHOD AND APPARATUS FOR THE USE OF CROSS MODAL ASSOCIATION TO ISOLATE INDIVIDUAL MEDIA SOURCES

RELATED APPLICATIONS

This Application is a National Phase of PCT Patent Application No. PCT/IL2008/000471 having International filing date of Apr. 6, 2008, which claims the benefit of U.S. Provisional Patent Application No. 60/907,536 filed on Apr. 6, 2007. The contents of the above Applications are all incorporated herein by reference.

FIELD AND BACKGROUND OF THE INVENTION

The present invention, in some embodiments thereof, relates to a method and apparatus for isolation of audio and like sources and, more particularly, but not exclusively, to the use of cross-modal association and/or visual localization for the same.

The term multi-modal signal processing naturally refers to many areas of application. Herein we describe recent relevant studies conducted in the specific field of audio-visual analysis. Studies in this field have been directed at solving many different tasks. Speech analysis is the most common one, since it is an essential tool in many human-computer interfaces. For instance: performing speech recognition in noisy environments can utilize lip images, rather than only speech sounds. This results in an improved performance in speech recognition [6, 65]. Other audio-visual tasks include: source separation based on vision [16, 27, 61]; and video event-detection [66]. Such integration of different modalities is backed by evidence that biological systems also fuse cross-sensory information to enhance their ability to understand their surroundings [22, 24].

Additional background art includes

[2] Z. Barzelay and Y. Y. Schechner. Harmony in motion. *Proc. IEEE CVPR* (2007).

[3] J. Bello, L. Daudet, S. Abdallah, C. Duxbury, M. Davies, and M. Sandler. A tutorial on onset detection in music signals. In *IEEE Trans. Speech and Audio Process.,* 5:1035{1047 (2005).

[5] S. Birchfield. An implementation of the Kanade-Lucas-Tomasi feature tracker. Available at www.ces.clemson-.edu/stb/klt/.

[6] C. Bregler, and Y. Konig Eigenlips for robust speech recognition. In *Proc. IEEE ICASSP*, vol. 2, pp. 667-672 (1994).

[10] D. Chazan, Y. Stettiner, and D. Malah. Optimal multi-pitch estimation using the EM algorithm for co-channel speech separation. In *Proc. IEEE ICASSP*, vol. 2, pp. 728{731 (1993).

[12] J. Chen, T. Mukai, Y. Takeuchi, T. Matsumoto, H. Kudo, T. Yamamura, and N. Ohnishi. Relating audio-visual events caused by multiple movements: in the case of entire object movement. *Proc. Inf. Fusion*, pp. 213-219 (2002).

[13] T. Choudhury, J. Rehg, V. Pavlovic, and A. Pentland. Boosting and structure learning in dynamic bayesian networks for audio-visual speaker detection. In *Proc. ICPR.*, vol. 3, pp. 789-794 (2002).

[16] T. Darrell, J. W. Fisher, P. A. Viola, and W. T. Freeman. Audio-visual segmentation and the cocktail party effect. In *Proc. ICMI*, pp. 1611-3349 (2000).

[27] J. Hershey and M. Casey. Audio-visual sound separation via hidden markov models. *Proc. NIPS*, pp. 1173-1180 (2001).

[28] J. Hershey and J. R. Movellan. Audio vision: Using audio-visual synchrony to locate sounds. *Proc. NIPS*, pp. 813-819 (1999).

[34] Y. Ke, D. Hoiem, and R. Sukthankar. Computer vision for music identification. *Proc. IEEE CVPR*, vol. 1, pp. 597-604 (2005).

[35] E. Kidron, Y. Y. Schechner, and M. Elad. Pixels that sound. *Proc. IEEE CVPR*, vol. 1, pp. 88-95 (2005).

[37] A. Klapuri. Sound onset detection by applying psychoacoustic knowledge. *Proc. IEEE ICASSP*, vol. 6, pp. 3089-3092 (1999).

[43] G. Monaci and P. Vandergheynst. Audiovisual gestalts. *Proc. IEEE Worksh. Percept. Org. in Comp. Vis.* (2006).

[48] T. W. Parsons. Separation of speech from interfering speech by means of harmonic selection. *Journal of the Acoustical Society of America,* 60:911-918 (1976). Cliffs, N.J.: Prentice-Hall (1978).

[53] S. Rajaram, A. Nefian, and T. Huang. Bayesian separation of audio-visual speech sources. *Proc. IEEE ICASSP, vol.* 5, pp. 657-660 (2004). Spatio-temporal Analysis. *ACM Multimedia*, (2003).

[55] S. Ravulapalli and S. Sarkar Association of Sound to Motion in Video using Perceptual Organization. *Proc. IEEE ICPR*, pp. 1216-1219 (2006).

[57] S. T. Roweis. One microphone source separation. *Proc. NIPS*, pp. 793-799 (2001).

[58] Y. Rui and P. Anandan. Segmenting visual actions based on spatio-temporal motion patterns. *Proc. IEEE CVPR*, vol. 1, pp. 13-15 (2000).

[60] J. Shi and C. Tomasi. Good features to track. *Proc. IEEE CVPR*, pp. 593-600 (1994).

[61] P. Smaragdis and M. Casey. Audio/visual independent components. *Proc. ICA*, pp. 709-714 (2003).

[63] T. Syeda-Mahmood Segmenting Actions in Velocity Curve Space. *Proc. ICPR*, vol. 4 (2002).

[64] C. Tomasi and T. Kanade Detection and Tracking of Point Features. *Carnegie Mellon University Technical Report CMU-CS*-91-132, April 1991.

[65] M. J. Tomlinson, M. J. Russell and N. M. Brooke. Integrating audio and visual information to provide highly robust speech recognition. *Proc. IEEE ICASSP*, vol. 2, pp. 821-824 (1996).

[66] Y. Wang, Z. Liu and J. C. Huang 2004, Multimedia content analysis-using both audio and visual clues. *IEEE Signal Processing Magazine,* 17:12-36 (2004).

[69] O. Yilmaz and S. Rickard. Blind separation of speech mixtures via time-frequency masking. *IEEE Trans. Sig. Process.,* 52:1830-1847 (2004).

SUMMARY OF THE INVENTION

The present embodiments relate to the enhancement of source localization using cross modal association between say audio events and events detected using other modes.

According to an aspect of some embodiments of the present invention there is provided apparatus for cross-modal association of events from a complex source having at least two modalities, multiple object, and events, the apparatus comprising:

a first recording device for recording the first modality;

a second recording device for recording a second modality;

an associator configured for associating event changes such as event onsets recorded in the first mode and changes/onsets recorded in the second mode, and providing an association between events belonging to the onsets;

a first output connected to the associator, configured to indicate ones of the multiple objects in the second modality being associated with respective ones of the multiple events in the first modality.

In an embodiment, the associator is configured to make the association based on respective timings of the onsets.

An embodiment may further comprise a second output associated with the first output configured to group together events in the first modality that are all associated with a selected object in the second modality; thereby to isolate a isolated stream associated with the object.

In an embodiment, the first mode is an audio mode and the first recording device is one or more microphones, and the second mode is a visual mode, and the second recording device is a camera.

An embodiment may comprise start of event detectors placed between respective recording devices and the correlator, to provide event onset indications for use by the associator.

In an embodiment, the associator comprises a maximum likelihood detector, configured to calculate a likelihood that a given event in the first modality is associated with a given object or predetermined events in the second modality.

In an embodiment, the maximum likelihood detector is configured to refine the likelihood based on repeated occurrences of the given event in the second modality.

In an embodiment, the maximum likelihood detector is configured to calculate a confirmation likelihood based on association of the event in the second modality with repeated occurrence of the event in the first mode.

According to a second aspect of the present invention there is provided a method for isolation of a media stream for respected detected objects of a first modality from a complex media source having at least two media modalities, multiple objects, and events, the method comprising:

recording the first modality;

recording a second modality;

detecting events and respective onsets or other changes of the events;

associating between events recorded in the first modality and events recorded in the second modality, based on timings of respective onsets and providing a association output; and isolating those events in the first modality associated with events in the second modality associated with a predetermined object, thereby to isolate a isolated media stream associated with the predetermined object.

In an embodiment, the first modality is an audio modality, and the second modality is a visual modality.

An embodiment may comprise providing event start indications for use in the association.

In an embodiment, the association comprises maximum likelihood detection, comprising calculating a likelihood that a given event in the first modality is associated with a given event of a specific object in the second modality.

In an embodiment, the maximum likelihood detection further comprises refining the likelihood based on repeated occurrences of the given event in the second modality.

In an embodiment, the maximum likelihood detection further comprises calculating a confirmation likelihood based on association of the event in the second modality with repeated occurrence of the event in the first modality.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to a method and apparatus for isolation of sources such as audio sources from complex scenes and, more particularly, but not exclusively, to the use of cross-modal association and/or visual localization for the same.

Cross-modal analysis offers information beyond that extracted from individual modalities. Consider a camcorder having a single microphone in a cocktail-party: it captures several moving visual objects which emit sounds. A task for audio-visual analysis is to identify the number of independent audio-associated visual objects (AVOs), pin-point the AVOs' spatial locations in the video and isolate each corresponding audio component. Part of these problems were considered by prior studies, which were limited to simple cases, e.g., a single AVO or stationary sounds. We describe an approach that seeks to overcome these challenges. The approach does not inspect the low-level data. Rather, it acknowledges the importance of mid-level features in each modality, which are based on significant temporal changes in each modality. A probabilistic formalism identifies temporal coincidences between these features, yielding cross-modal association and visual localization. This association is further utilized in order to isolate sounds that correspond to each of the localized visual features. This is of particular benefit in harmonic sounds, as it enables subsequent isolation of each audio source, without incorporating prior knowledge about the sources. We demonstrate this approach in challenging experiments. In these experiments, multiple objects move simultaneously, creating motion distractions for one another, and produce simultaneous sounds which mix. Yet, the results demonstrate spatial localization of correct visual features out of hundreds of possible candidates, and isolation of the non-stationary sounds that correspond to these distinct visual features.

This work deals with complex scenarios that are sometimes referred to as a cocktail party, multiple sources exist simultaneously in all modalities. This inhibits the interpretation of each source. In the domain of audio-visual analysis, a camera views multiple independent objects which move simultaneously, while some of them emanate sounds, which mix. The present disclosure presents a computer vision approach for dealing with this scenario. The approach has several notable results. First, it automatically identifies the number of independent sources.

Second, it tracks in the video the multiple spatial features, that move in synchrony with each of the (still mixed) sound sources. This is done even in highly non stationary sequences. Third, aided by the video data, it successfully separates the audio sources, even though only a single microphone is used.

Figure 3:
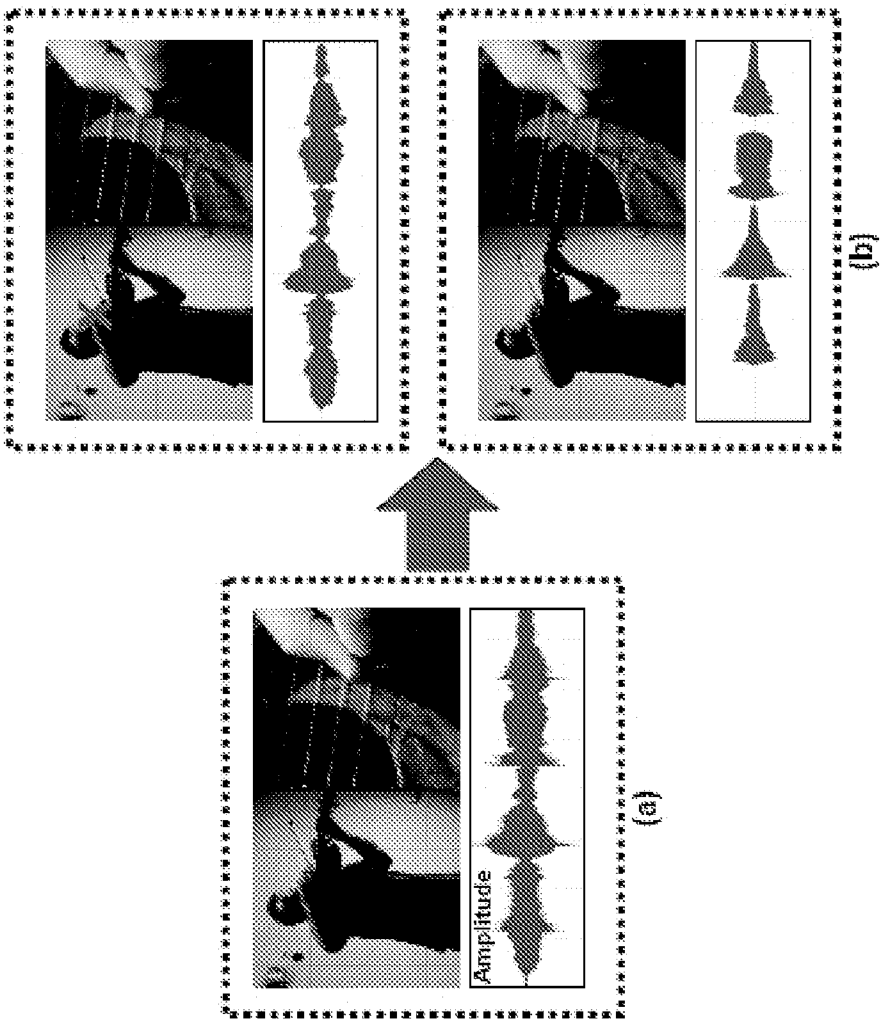
FIG. 3 is a simplified diagram illustrating how a combined audio track can be split into two separate audio tracks based on association with events of two separate objects according to an embodiment of the present invention.

This completes the isolation of each contributor in this complex audio-visual scene, as depicted in FIG. 3. FIG. 3 illustrates in a) a frame of a recorded stream and in b) the goal of extracting the separate parts of the audio that correspond to the two objects, the guitar and violin, marked by x's.

A single microphone is simpler to set up, but it cannot, on its own, provide accurate audio spatial localization. Hence, locating audio sources using a camera and a single microphone poses a significant computational challenge. In this context, Refs. [35, 43] spatially localize a single audio-associated visual object (AVO). Ref. [12] localizes multiple AVOs if their sounds are repetitive and non-simultaneous. Neither of these studies attempted audio separation. A pioneering exploration of audio separation [16] used complex optimization of mutual information based on Parzen windows. It can automatically localize an AVO if no other sound is present. Results demonstrated in Ref. [61] were mainly of repetitive sounds, without distractions by unrelated moving objects.

Here we propose an approach that appears to better manage obstacles faced by prior methods. It can use the simplest hardware: a single microphone and a camera.

Algorithmically, we are inspired by feature-based image registration methods, which use spatial significant changes (e.g, edges and corners). Analogously, we use as our features the temporal instances of significant changes in each modality. To match the two modalities, we look for cross-modal temporal coincidences of events. We formulate a likelihood criterion, and use it in a framework that sequentially localizes the AVOs. This results in a continuous audio-visual association throughout the sequence.

Following the visual localization of the AVOs, the sound produced by each AVO is isolated. The audio-isolation process is highly simplified and efficient when the mixed audio sources are harmonic ones. Harmonic sounds usually exhibit a sparse time-frequency (T-F) distribution. Therefore, they should rarely exhibit a time-frequency overlap.

Traditional audio-only isolation methods have also utilized harmonicity assumptions. However, the presented method is significantly aided by the essential visual information. This enables the isolation of mixed sounds in challenging scenes.

The present embodiments deal with the task of relating audio and visual data in a scene containing single and/or multiple AVOs, and recorded with a single and/or multiple camera and a single and/or multiple microphone. This analysis is composed of two subsequent tasks. The first one is spatial localization of the visual features that are associated with the auditory soundtrack. The second one is to utilize this localization to separately enhance the audio components corresponding to each of these visual features. This work approached the localization problem using a feature-based approach. Features are defined as the temporal instances in which a significant change takes place in the audio and visual modalities. The audio features we used are audio onsets (beginnings of new sounds). The visual features were visual onsets (instances of significant change in the motion of a visual object). These audio and visual events are meaningful, as they indeed temporally coincide in many real-life scenarios.

This temporal coincidence is used for locating the AVOs. We exploit the fact that typically, even for scenes containing simultaneous sounds and motions, audio and visual onsets are temporally sparse.

Using a maximum-likelihood criterion to match these events, we iteratively find the AVOs. This process also resulted in grouping of the audio onsets, where each group corresponds to a different visual feature.

These groups of audio-onsets are exploited in order to complete the second audio-visual analysis task: isolation of the independent audio sources. Each group of audio onsets points to instances in which the sounds belonging to a specific visual feature commence. In order to emphasize the onsets of the sounds of interest over interfering sounds, we calculate a measure similar to a temporal directional-derivative of the spectrogram. We inspect this derivative image in order to detect the pitch-frequency of the commencing sounds, that were assumed to be harmonic.

By following the pitch frequency through time, we determine which T-F components compose the sounds of interest. By keeping only these audio components (a binary-masking procedure), we synthesize a soundtrack containing only the sounds of a single AVO.

The principles posed here (namely, the audio-visual feature-based approach) utilize only a small part of the cues that are available for audio-visual association. Thus, the present embodiments may become the basis for a more elaborate audio-visual association process. Such a process may incorporate a requirement for consistency of auditory events into the matching criterion, and thereby improve the robustness of the algorithm, and its temporal resolution. We further suggest that our feature-based approach can be a basis for multi-modal areas other than audio and video domains.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
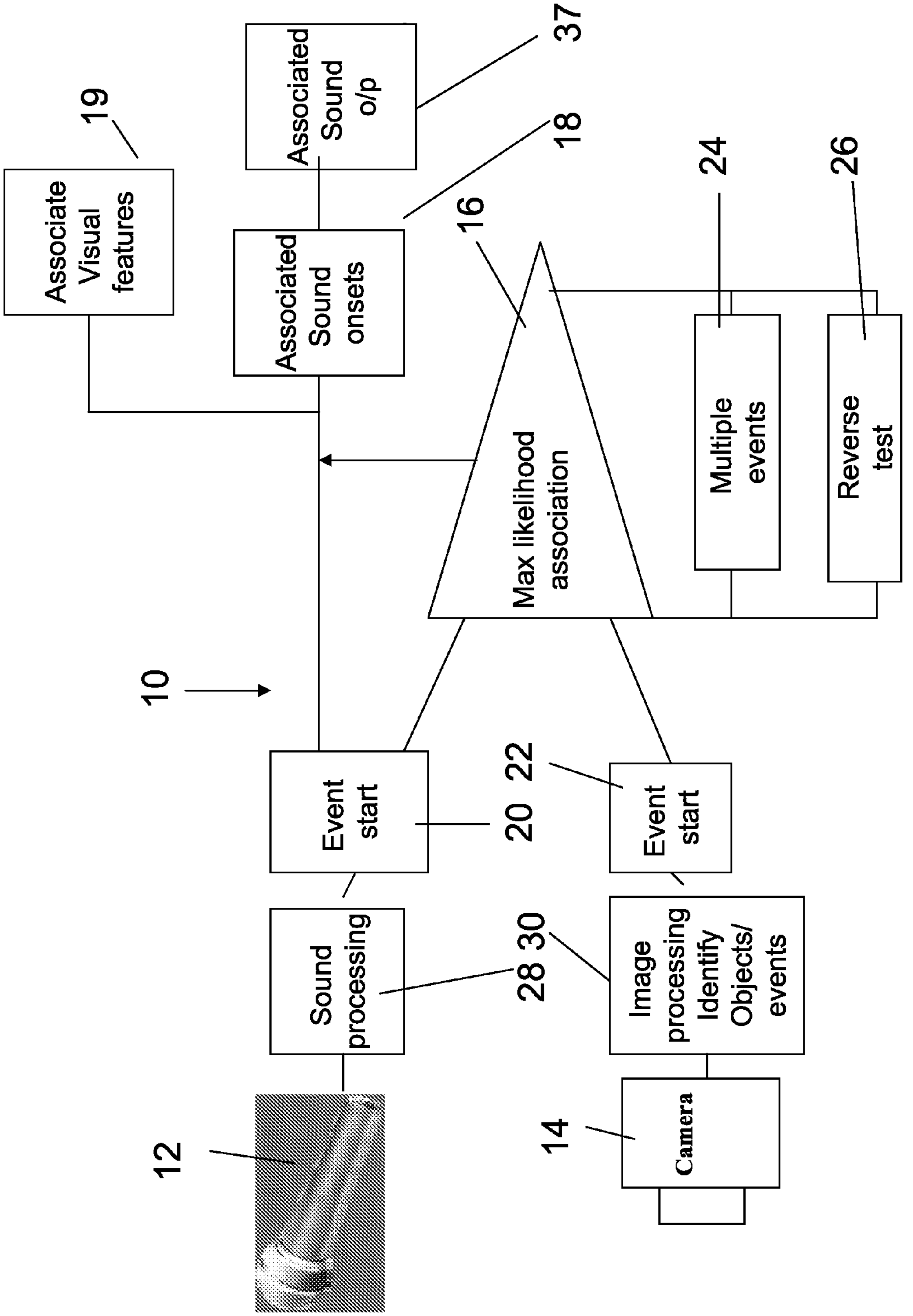
FIG. 1 is a simplified diagram illustrating apparatus according to a first embodiment of the present invention.

Referring now to the drawings, FIG. 1 illustrates apparatus 10 for isolation of a media stream of a first modality from a complex media source having at least two media modalities, multiple objects, and events. The media may for example be video, having an audio modality and a motion image modality. Some events in the two modalities may associate with each other, say lip movement may associate with a voice. There may be numerous visual objects in the image, say different people, for whom different events occur.

In an embodiment the apparatus initially detects the spatial locations of objects in the video modality that are associated with the audio stream. This association is based on temporal co-occurrence of audio and visual change events. A change event may be on onset of an event or a change in the event, in particular measured as an acceleration from the video. An audio onset is an instance in which a new sound commences. A visual onset is defined as an instance in which a significant motion start or change such as a change in direction or a change in acceleration in the video takes place. Here we track the motion of features, namely objects in the video, and look for instances where there is a significant change in the motion of the object. In the present embodiments we look at the acceleration of the object. However we may use other measurements besides acceleration. Also, we do not have to track each object separately. We may equally well just look for significant temporal changes in the video, rather than those of a specific object, and associate them with the onsets of the audio.

The preferred embodiments use repeated occurrences of the onsets of single visual objects with those of sound onsets to calculate the likelihood that the object under consideration is associated with the audio. For instance: you may move your hand at the exact same time that I open my mouth to start to speak but this is mere coincidence. However, in the long run, the event of my mouth opening would have more co-occurrences with my sound onsets than your hand.

Once we identify the object/s whose onsets are associated with the audio onsets, this accomplishes a significant goal: telling which objects/locations in the video are associated with the audio.

Now we move on to the $2^{nd}$ stage: we know at which instances sounds that belong to each object commence. We can therefore attempt to isolate the sounds of each of the objects. However it is noted that even without audio isolation, the present embodiments have the ability to say which spatial locations in the video are associated with the audio, and also which audio onsets are associated with the video we see.

Apparatus 10 is intended to identify events in the two modes. Then those events in the first mode that associate with events relating to an indicated object of the second mode are isolated. Thus in the case of video, where the first mode is audio and the second mode is moving imagery, an object such as a person's face may be selected. Events such as lip movement may be taken, and then sounds which associate to the lip motion may be isolated.

The apparatus comprises a first recording device 12 for recording the first mode, say audio. The apparatus further comprises a second recording device 14 for recording a second mode, say a camera, for recording video.

A correlator 16 then associates between events recorded in the first mode and events recorded in the second mode, and provides a association output. The coincidence does not have to be exact but the closer the coincidence the higher the recognition given to the coincidence.

A maximum likelihood correlator may be used which iteratively locates visual features that are associated with the audio onsets. These visual features are outputted in 19. The audio onsets that are associated to visual features in sound output 18 are also output. That is to say that the beginning of sounds that are related to visual objects are temporally identified. They are then further processed in sound output 37.

An associated sound output 37 then outputs only the filtered or isolated stream. That is to say it uses the correlator output to find audio events indicated as correlating with the events of interest in the video stream and outputs only these events.

Start of event detectors 20 and 22 may be placed between respective recording devices and the correlator 16, to provide event start indications. The times of event starts can then be compared in the correlator.

In an embodiment the correlator is a maximum likelihood detector. The correlator may calculate a likelihood that a given event in the first mode is associated with a given event in the second mode.

In a further embodiment the association process is repeated over the course of playing of the media, through multiple events module 24. The maximum likelihood detector refines the likelihood based on repeated occurrences of the given event in the second mode. That is to say, as the same video event recurs, if it continues to coincide with the same kind of sound events then the association is reinforced. If not then the association is reduced. Pure coincidences may dominate with small numbers of event occurrences but, as will be explained in greater detail below, will tend to disappear as more and more events are taken into account.

In one particular embodiment a reverse test module 26 is used. The reverse test module takes as its starting point the events in the first mode that have been found to coincide, in our example the audio events. Module 26 then calculates a confirmation likelihood based on association of the event in said second mode with repeated occurrence of the event in the first mode. That is to say it takes the audio event as the starting point and finds out whether it coincides with the video event.

Image and audio processing modules 28 and 30 are provided to identify the different events. These modules are well-known in the art.

Figure 2:
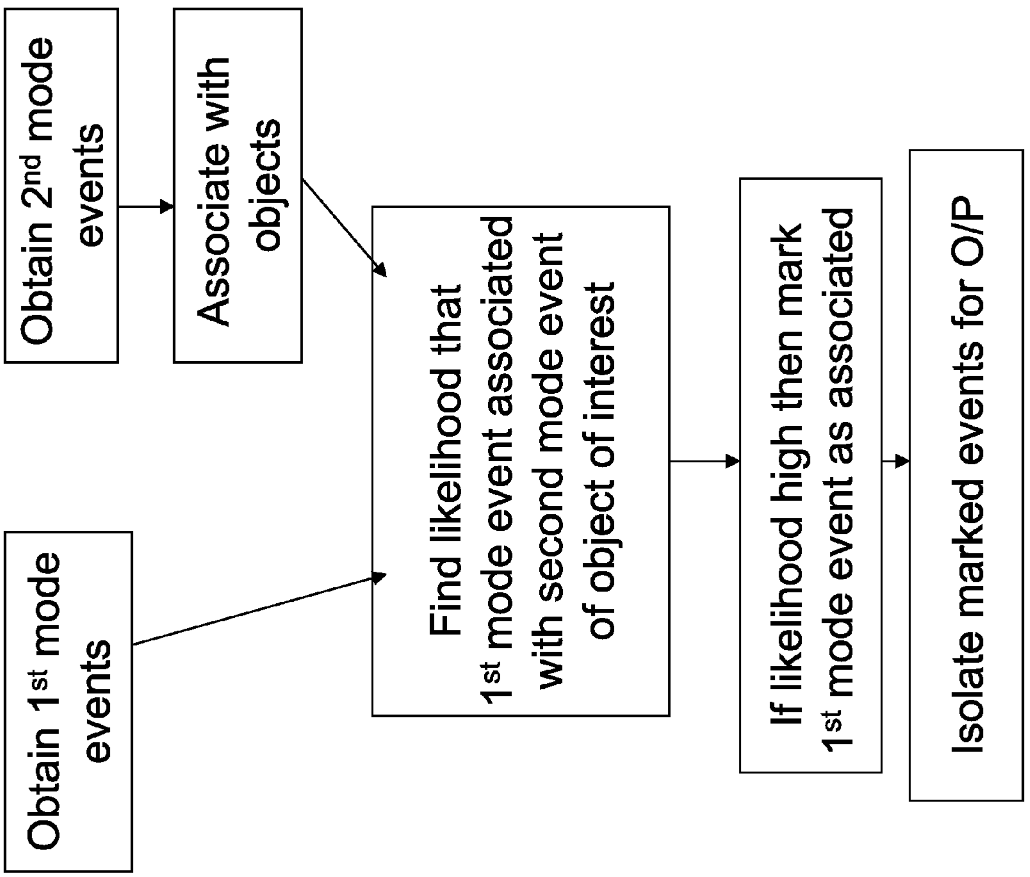
FIG. 2 is a simplified diagram showing operation according to an embodiment of the present invention.

Reference is now made to FIG. 2, which illustrates the operation of the apparatus of FIG. 1. The first and second mode events are obtained. The second mode events are associated with events of the first mode (video). Then for each tracked object in the first mode (video), the likelihood of this object being associated with the $2^{nd}$ mode (the audio) is computed, by analyzing the rate of co occurrence of events in the $2^{nd}$ mode with the events of the object of the $1^{st}$ mode (video). The first mode objects whose events show the maximum likelihood association with the $2^{nd}$ mode are flagged as being associated. Consequently:

1) the object in the $1^{st}$ mode (the video) which is flagged as associated to the $2^{nd}$ mode is marked (for instance, by an X as in FIG. 2); and 2) the events of the object can further be isolated for output. The maximum likelihood may be reinforced as discussed by repeat associations for similar events over the duration of the media. In addition the association may be reinforced by reverse testing, as explained.

As described hereinabove the present embodiments may provide automatic scene analysis, given audio and visual inputs. Specifically, we wish to spatially locate and track objects that produce sounds, and to isolate their corresponding sounds from the soundtrack.

The desired sounds may then be isolated from the audio. A simple single microphone may provide only coarse spatial data about the location of sound sources. Consequently, it is much more challenging to associate the auditory and visual data.

As a result, single-camera single-microphone (SCSM) methods have taken a variety of approaches in order to associate audio and visual descriptions of a scene.

These approaches can be roughly divided into two main schools. The first school is data-driven, and uses raw (or linearly processed) audio and visual data. Pixels (or clusters of pixels) are matched against raw audio data. Two main representatives of this approach are Refs. [16, 35]. These studies formulated the problem of audio-visual association as that of finding a linear combination of image patches, whose temporal behavior \best matches" the temporal behavior of a linear combination of acoustic frequency bands. The best match in Ref. [16] is the match that maximizes the mutual information between the linear combinations. In Ref. [35] it is the sparsest set of image patches that results in a full association. Neither study reports tests on scenes containing multiple audio-associated visual objects (AVOs). Furthermore in the framework of Ref. [35], it is not clear how consequent audio isolation can be performed. Audio isolation in Ref. [16] was demonstrated only with user guidance. Even then, the isolation procedure was heuristic by nature.

The second school in SCSM methods is feature-driven. The analysis no longer aimed at maximizing audio-visual association at each and every frame of the sequence. Rather, it aims at extracting higher-level features from each modality. These features are then compared, not necessarily on a frame-by-frame basis. In this context, Ref. [43] examines the visual data only at instances of maximal auditory energy.

If at these instances a visual patch has reached maximal spatial displacement from its initial location, it is deemed as being associated to the audio. A drawback of the method is its sensitivity to the reference coordinate system. Ref. [55] assumes that the scene contains only repetitive sounds, which are emitted by objects performing repetitive motions. Ref. [55] further assumes periodic motions and sounds. This naturally limits the applicability of these methods. None of these papers reports consequent audio isolation.

The approach presented in this work belongs categorically to the second school presented above. Here we propose an approach that better manages obstacles faced by these prior methods. Algorithmically, our approach is inspired by feature-based image registration methods, which use spatial significant changes (e.g, edges and corners). Analogously, we use as our features the temporal instances of significant changes in each modality. To match the two modalities, we look for cross-modal temporal coincidences of events. Based on a derived likelihood criterion, the AVOs are localized and traced throughout the sequence. The established audio-visual temporal coincidences then play a major role in the consequent audio-isolation stage.

Audio-Enhancement Methods

Audio-isolation and enhancement of independent sources from a soundtrack is a widely-addressed problem. The best results are generally achieved by utilizing arrays of microphones. These multi-microphone methods utilize the fact that independent sources are spatially separated from one another.

In the audio-visual context, these methods may be farther incorporated in a system containing one camera or more [46, 45].

The fact that independent sources are spatially distinct is of little use, however, when only a single microphone is available. A single microphone may provide only coarse spatial localization. Consequently, the inverse problem of extracting one or more sources from a single mixture is ill-posed. In order to lift this ill-posedness, one needs to limit the feasible solutions to the problem. This is commonly achieved by incorporating prior knowledge about the sources. Such a knowledge may be introduced into the problem in various ways. Some methods train on samples of the sources (or typical sources) that are to be mixed [57]. Others use an a-priori knowledge about the nature of the mixed sources, and particularly assuming that the sources have an harmonic structure [19, 38, 48]. These methods usually require advance knowledge of the number of mixed harmonic sounds [48,].

In the presently described embodiments we additionally assume that the mixed sounds are harmonic. The method is not of course necessarily limited to harmonic sounds. Unlike previous methods, however, we attempt to isolate the sound of interest from the audio mixture, without knowing the number of mixed sources, or their contents. Our audio isolation is applied here to harmonic sounds, but the method may be generalized to other sounds as well. The audio-visual association is based on significant changes in each modality Hence, our approach relies heavily on an audio-visual association stage.

Background

Short Time Fourier Transform

Figure 4:
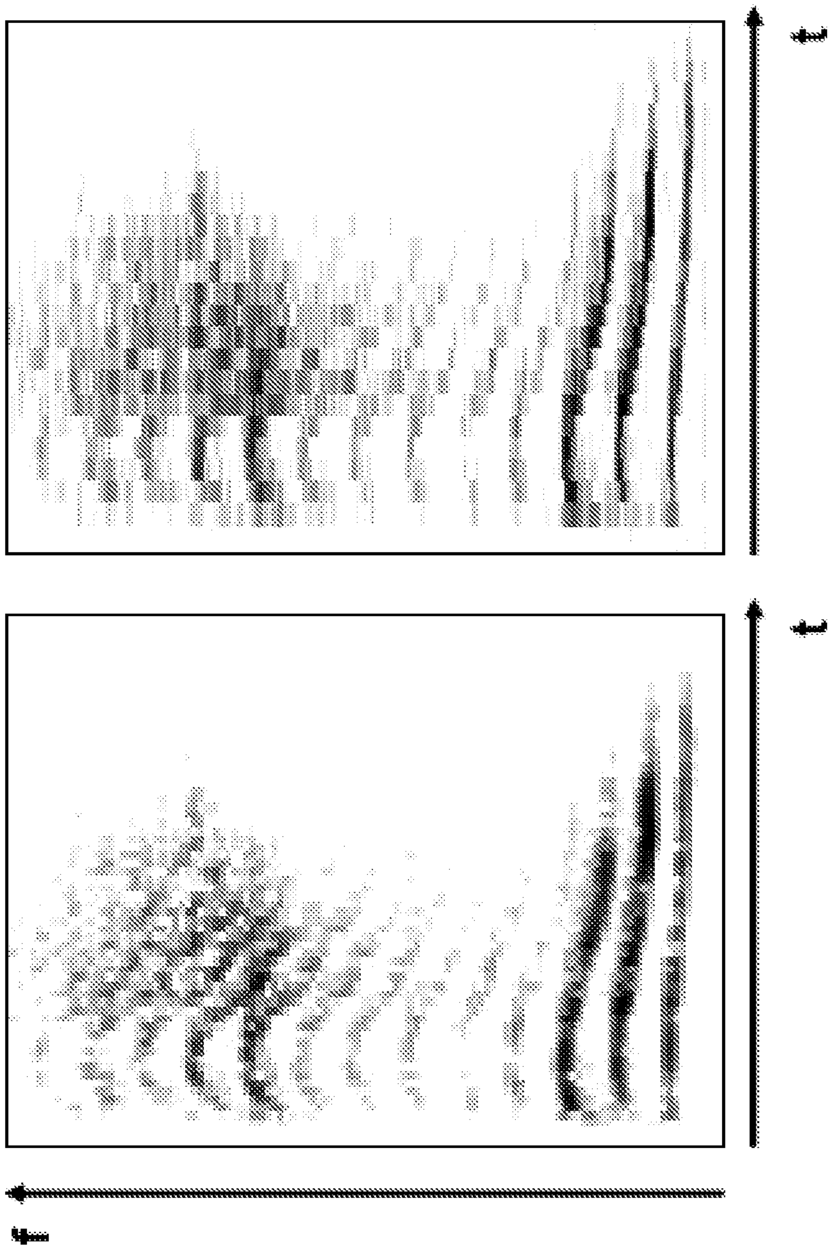
FIG. 4 shows the amplitude image of a speech utterance in two different sized Hamming windows, for use in embodiments of the present invention.

Let s(n) denote a sound signal, where n is a discrete sample index of the sampled sound. This signal is analyzed in short temporal windows w, each being $N_w$-samples long. Consecutive windows are shifted by $N_{sft}$ samples. The short-time Fourier transform of s(n) is $$S(t,f)=\sum_{n=0}^{N_w-1} s(n+tN_{sft})w(n)e^{-j(2\pi/N_w)nf}, \tag{3.1}$$

where f is the frequency index and t is the time index of the analyzed instance. As an example, the amplitude $$A(t,f)=|S(t,f)| \tag{3.2}$$

corresponding to a short speech segment is given in FIG. 4. The spectrogram is defined as $A(t, f)^2$.

To re-synthesize a discrete signal given its STFT S(t, f), the overlap-and-add (OLA) method may be used. It is given by $$\hat{s}(n) = \frac{1}{C_{OLA}} \sum_{r=-\infty}^{\infty} \left[ \frac{1}{N_w} \sum_{f=0}^{N_w-1} S(rN_{sft}, f) e^{j(2\pi/N_w)nf} \right], \tag{3.3}$$

Here, $C_{OLA}$ is a multiplicative constant. If for all n $$C_{OLA} = \sum_{r=-\infty}^{\infty} w[rN_{sft} - n], \tag{3.4}$$

then ^s(n)=s(n). Eq. (3.3) and (3.4) state that the overlap and add operation effectively eliminates the analysis window from the synthesized sequence. The intuition behind the process is that the redundancy within overlapping segments and the averaging of the redundant samples remove the effect of windowing.

Harmonic Sounds

Reference is now made to FIG. 4, which illustrates an amplitude image of a speech utterance. A Hamming window of different lengths is applied, shifted with 50% overlap. In the left hand rectangle the window length is 30 mSec, and good temporal resolution is achieved. The fine structure of the harmonics is apparent. In the right hand window an 80 mSec window is shown. A finer frequency resolution is achieved. The fine temporal structure of the high harmonies is less apparent.

FIG. 4 depicts the amplitude of the STFT corresponding to a speech segment. The displayed frequency contents in some temporal instances appear as a stack of horizontal lines, with a fixed spacing. This is typical of harmonic sounds. The frequency contents of an harmonic sound contain a fundamental frequency $f_0$, along with integer multiples of this frequency. The frequency $f_0$ is also referred to as the pitch frequency. The integer multiples of $f_0$ are referred to as the harmonies of the sound. A harmonic sound is a quasi-periodic sound with a period of $t_0=1/f_0$.

A variety of sounds of interest are harmonic, at least for short periods of time. Examples include: musical instruments (violin, guitar, etc.), and voiced parts of speech. These parts are produced by quasi-periodic pulses of air which excite the vocal tract. Many methods of speech or music processing aimed at efficient and reliable extraction of the pitch-frequency from speech or music segments [10, 51].

The HPS Pitch-Detection Method to extract the pitch-frequency of a sound from a given STFT-amplitude segment we chose to use the harmonic-product-spectrum (HPS) method. We now review it briefly based on [15].

The harmonic product spectrum is defined as $$P(t, f) = \prod_{k=1}^{K} A(t, f \cdot k)^2, \tag{3.5}$$

where K is the number of considered harmonics. Taking the logarithm gives $$\hat{P}(t, f) = 2\sum_{k=1}^{K} \log A(t, f \cdot k). \tag{3.6}$$

The pitch frequency is found as $$\hat{f}_0 = \underset{f}{\operatorname{argmax}}\, \hat{P}(t, f). \tag{3.7}$$

Often, the pitch frequency estimated by HPS is double or half the true pitch. To correct for this error, some postprocessing should be performed [15]. The postprocessing evaluates the ratio $$\frac{\hat{P}(t, \hat{f}_0)}{\hat{P}(t, \hat{f}_0/2)}.$$

If the ratio is larger than a given threshold $\delta_{half}$, then $(\hat{f}_0=2)$ is selected as the pitch frequency [15].

Audio Isolation by Binary Masking

In the present embodiments we attempt to isolate sounds from a mixture containing several sounds. Let $s_{desired}$, $s_{interfere}$ and $s_{mix}$ denote the source of interest, the interfering sounds, and the mixture, respectively. Then $$s_{mix}=s_{desired}+s_{interfere}. \tag{3.8}$$

If we observe the STFT-amplitude of $s_{desired}$ in FIG. 4, we can see that it lies in a set $\Gamma_{desired}$ of time-frequency bins {(t, f)}. A common assumption of many audio-isolation methods [1, 57, 69] is that if there are other natural sound sources, then the energy distribution in {(t; f)} of these disturbances has only little overlap with the bins in $\Gamma_{desired}$. This assumption is based on the sparsity of typical sounds, particularly harmonic ones, in the spectrogram. Consequently, a sound of interest can be enhanced by maintaining the values of S(t; f) in $j_{desired}$, while nulling the other bins. Formally, define the mask $$M_{desired}(t, f) = \begin{cases} 1 & (t, f) \in \Gamma_{desired} \\ 0 & \text{otherwise.} \end{cases} \tag{3.9}$$

Then the binary masked amplitude of the STFT of the desired signal is estimated by $$\hat{A}_{desired}(t,f)=M_{desired}(t,f)\cdot A_{mix}(t,f). \tag{3.10}$$

Here · denotes bin-wise multiplication. The estimated $\hat{A}_{desired}$(t, f) is combined with the short-time phase $\angle S_{mix}$(t, f) into Eq. (3.3), in order to construct the estimated desired signal:

$$\hat{s}(n) = \frac{1}{C_{OLA}} \sum_{r=-\infty}^{\infty} \left[ \frac{1}{N_w} \sum_{f=0}^{N_w-1} \hat{A}_{deisred}(rN_{sft}, f) e^{\angle S_{mix}(rN_{sft}, f)} e^{j(2\pi/N_w)nf} \right]. \tag{3.11}$$

This binary masking process forms the basis for many methods [1, 57, 69] of audio isolation.

The mask $M_{desired}$(t, f) may also include T-F components that contain energy of interfering sounds. Consider a T-F component denoted as ($t_{overlap}$; $f_{overlap}$), which contains energy from both the sound of interest $s_{desired}$ and also energy of interfering sounds $s_{interfere}$. To deal with this situation, an empirical approach [57] backed by a theoretical model [4] may be taken. This approach associates the T-F component ($t_{overlap}$; $f_{overlap}$) with $s_{desired}$ only if the estimated amplitude $\hat{A}_{desired}(t_{overlap}; f_{overlap})$ is larger than the estimated amplitude of the interferences. Formally:

$$M_{desired}(t_{overlap}, f_{overlap}) = \begin{cases} 1 & \text{if } A_{desired}(t_{overlap}, f_{overlap}) > A_{intrefer}(t_{overlap}, f_{overlap}) \\ 0 & \text{otherwise} \end{cases} \quad (3.12)$$

In order to evaluate Eq. (3.12), however, the amplitudes of the source of interest and of the interferences need to be estimated. This usually requires prior knowledge both about the source of interest, and about the interferences. This knowledge is usually incorporated into the system by means of a pre-processing training stage [1, 4, 57].

Significant Visual and Audio Events

How may we associate two modalities where each changes in time? Some prior methods use continuous valued variables to represent each modality, e.g., a weighted sum of pixel values. Maximal canonical association or mutual information was sought between these variables [16, 28, 35]. That approach is analogous to intensity-based image matching. It implicitly assumes some association (possibly nonlinear) between the raw data values in each modality. In this work we do not look at the raw data values during the cross-modal association. Rather, here we opt for feature-based matching: we seek correspondence between significant features in each modality. In our audio-visual matching problem, we use features having strong temporal variations in each of the modalities.

Visual Features

Figure 5:
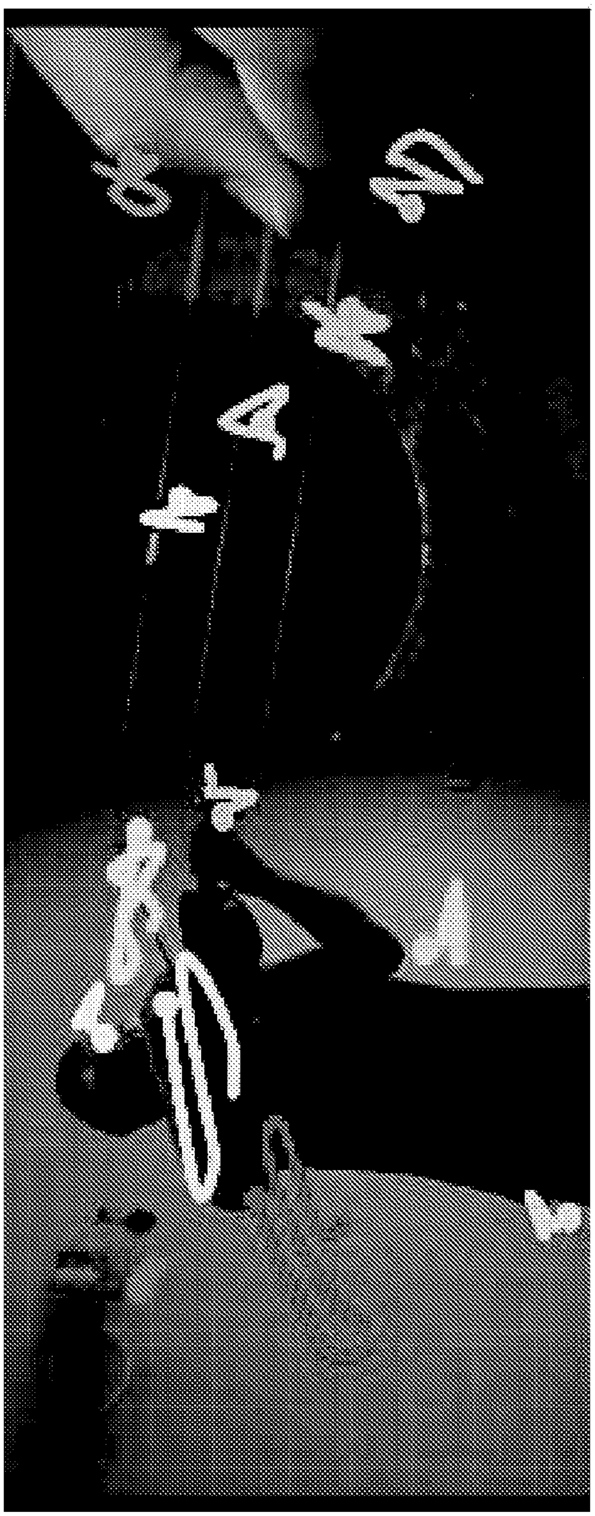
FIG. 5 is an illustration of the feature tracking process according to an embodiment of the present invention in which features are automatically located, and their spatial trajectories are tracked.

Reference is now made to FIG. 5, which is a schematic illustration of a feature tracking process according to the present embodiments. In the method features are automatically located and then their spatial trajectories are tracked. Typically hundreds of features may be tracked.

The present embodiments aim to spatially localize and track moving objects, and to isolate the sounds corresponding to them. Consequently, we do not rely on pixel data alone. Rather we look for a higher-level representation of the visual modality. Such a higher-level representation should enable us to track highly non-stationary objects, which move throughout the sequence.

A natural way to track exclusive objects in a scene is to perform feature tracking. The method we use is described hereinbelow. The method automatically locates image features in the scene. It then tracks their spatial positions throughout the sequence. The result of the tracker is a set of $N_v$ visual features. Each visual feature is indexed by $i \in [1, N_v]$. Each feature has a spatial trajectory $v_i(t)=[x_i(t), y_i(t)]^T$, where t is the temporal index (in units of frames), and x; y are the image coordinates, and T denotes transposition. An illustration for the tracking process is shown in FIG. 5, referred to above. Typically, the tracker successfully tracks hundreds of moving features, and we now aim to determine if any of the trajectories is associated with the audio.

To do this, we first extract significant features from each trajectory. These features should be informative, and correspond to significant events in the motion of the tracked feature. We assume that such features are characterized by instances of strong temporal variation [54, 63], which we term visual onsets. Each visual feature is ascribed a binary vector $v_i^{on}$ that compactly summarizes its visual onsets:

$$v_i^{on}(t) = \begin{cases} 1 & \text{if feature } i \text{ has a visual onsets at } t \\ 0 & \text{otherwise.} \end{cases} \quad (4.1)$$

For all features fig, the corresponding vectors $v_i^{on}$ have the same length $N_f$, which is the number of frames. In the following section we describe how the visual onsets corresponding to a visual feature are extracted.

Extraction of Visual Onsets.

We are interested in locating instances of significant temporal variation in the motion of a visual feature. An appropriate measure is the magnitude of the acceleration of the feature, since it implies a significant change in the motion speed or direction of the feature. Formally, we denote the velocity and the acceleration of feature i at instance t by:

$$\dot{v}_i(t)=v_i(t)-v_i(t-1) \quad (4.2)$$

$$\ddot{v}_i(t)=\dot{v}_i(t)-\dot{v}_i(t-1), \quad (4.3)$$

respectively. Then $$o_i^{visual}(t)=\|\ddot{v}_i(t)\| \quad (4.4)$$

is a measure of significant temporal variation in the motion of feature i at time t. We note that before calculating the derivatives of Eq. (4.3), we need to suppress tracking noise. Further details are given hereinabove. From the measure $o_i^{visual}(t)$, we deduce the set of discrete instances in which a visual onset occurs. Roughly speaking, the visual onsets are located right after instances in which $o_i^{visual}(t)$ has local maxima. The process of locating the visual onsets is summarized in Table 2. Next we go into further details.

TABLE 1

| Detection of Visual Onsets |
|---|
| Input: the trajectory of feature i: $v_i(t)$ |
| Initialization: null the output onsets vector $v_i^{on}(t) \equiv 0$ |
| Pre-Processing: Smooth $v_i(t)$. Calculate $\hat{o}_i^{visual}(t)$ from Eq. (4.5) |
| 1. Perform adaptive thresholding on $\hat{o}_i^{visual}(t)$ (App. B) |
| 2. Temporally prune candidate peaks of $\hat{o}_i^{visual}(t)$ (see text for further details) |
| 3. For each of the remaining peaks $t_i$ do |
| 4. while there is a sufficient decrease (Eq. (4.6)) in $\hat{o}_i^{visual}(t_i)$ |
| 5. set $t_i = t_i + 1$ |
| 6. The instance $t_v^{on} = t_i$ is a visual onset; Consequently, set $v_i^{on}(t_v^{on}) = 1$ |
| Output: The binary vector $v_i^{on}$ of visual onsets corresponding to feature i. |

First, $o_i^{visual}(t)$ normalized by its maximal value, so that its values are in the range [0, 1]:

$$\hat{o}_i^{visual}(t) = \frac{o_i^{visual}(t)}{\max_t o_i^{visual}(t)}. \quad (4.5)$$

Next, the normalized measure is adaptively thresholded (see Adaptive thresholds section). The adaptive thresholding process results in a discrete set of candidate visual onsets, which are local peaks of $\hat{o}_i^{visual}(t)$, and exceed a given threshold. Denote this set of temporal instances by $V_i^{on}$ Next, $V_i^{on}$ is temporally pruned. The motion of a natural object is generally temporally coherent [58]. Hence, the analyzed motion trajectory should typically not exhibit dense events of change. Consequently, we remove candidate onsets if they are closer than $\delta_{visual}^{prune}$ to another onset candidate having a higher peak of $\hat{o}_i^{visual}(t)$. Formally, let $t_1$; $t_2 \in V_i^{on}$. The visual onsets measure associated with each of these onset instances are $\hat{o}_i^{visual}(t_1)$ and $\hat{o}_i^{visual}(t_2)$, respectively.

Suppose that $\hat{o}_i^{visual}(t_1) < \hat{o}_i^{visual}(t_2)$. Then, the candidate onset at $t_1$ is excluded from $V_i^{on}$.

Typically in our experiments, $\delta_{visual}^{prune}=10$ frames in movies having a 25 frames/sec rate. This effectively means that on average, we can detect up to 2.5 visual events of a feature per second.

Finally, the remaining instances in $V_i^{on}$ are further processed in order to locate the visual onsets. Each temporal location $t_v^{on} \in V_i^{on}$ is currently located at a local maximum of $\hat{o}_i^{visual}(t)$. The last step is to shift the onset slightly forward in time, away from the local maximum, and towards a smaller value of $\hat{o}_i^{visual}(t)$. The onset is iteratively shifted this way, while the following condition holds:

$$\frac{\hat{o}_i^{visual}(t_i) - \hat{o}_i^{visual}(t_i+1)}{\hat{o}_i^{visual}(t_i)} > \delta_{diff} \quad (4.6)$$

Figure 6:
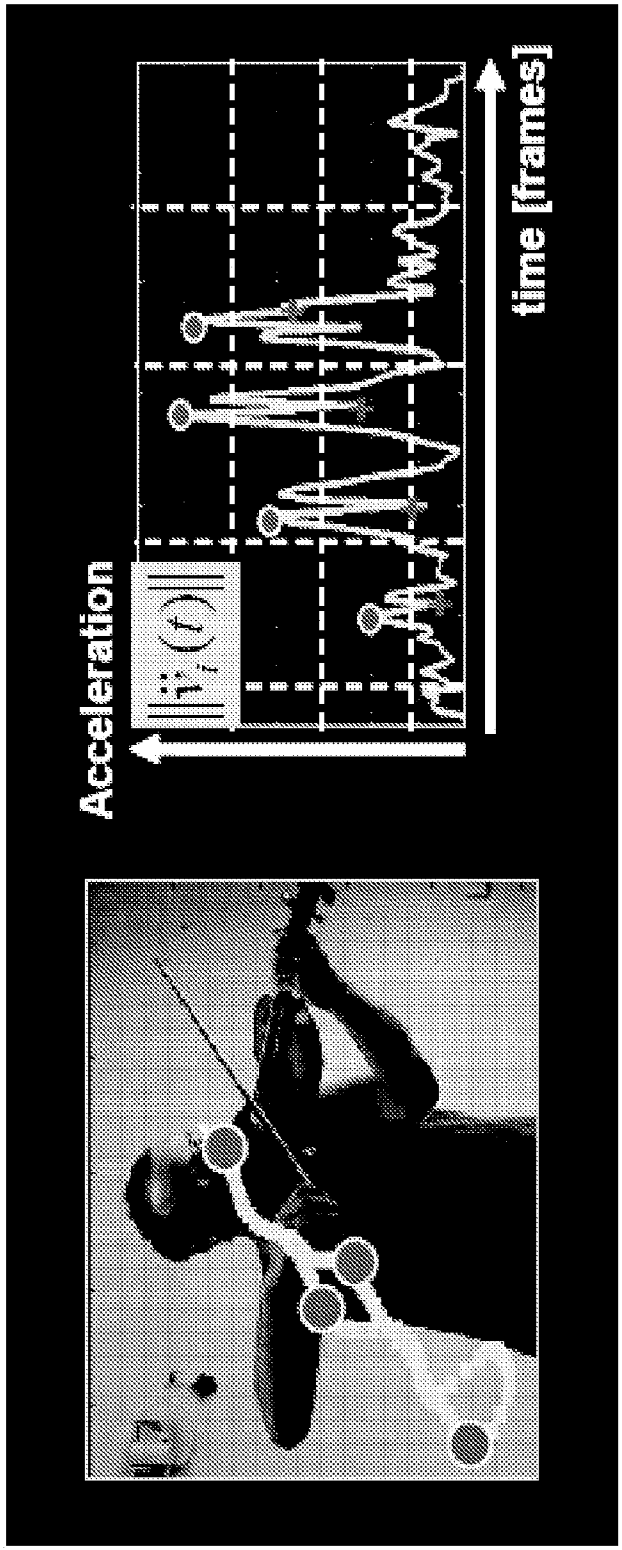
FIG. 6 is a simplified diagram illustrating how an event can be tracked in the present embodiments by tracing the locus of an object and obtaining acceleration peaks.

Typically, onsets are shifted in not more than 2 or 3 frames. To recap, the process is illustrated in FIG. 6, to which reference is now made. In FIG. 6, a trajectory over the violin corresponds to the instantaneous locations of a feature on the violinist's hand. The acceleration against time of the feature is plotted and periods of acceleration maximum may be recognized as event starts.

Audio Features

Figure 7:
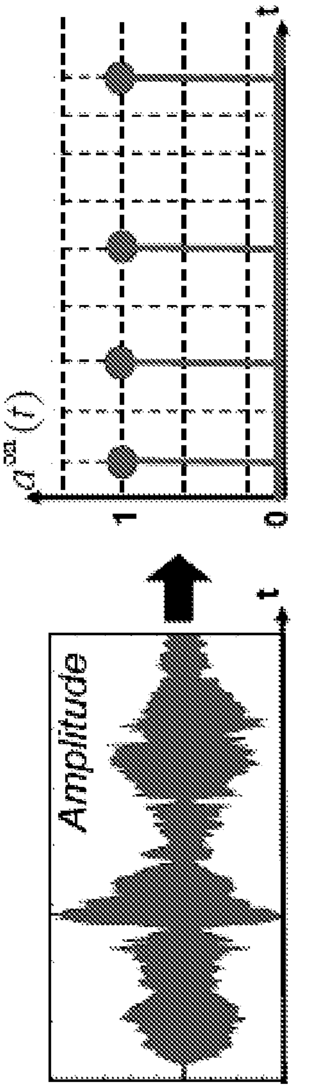
FIG. 7 is a graph showing event starts on a soundtrack, corresponding to the acceleration peaks of FIG. 6.

FIG. 7 illustrates detection of audio onsets in that dots point to instances in which a new sound commences in the soundtrack. We now aim to extract significant temporal variations from the auditory data. We focus on audio onsets [7]. These are time instances in which a sound commences, perhaps over a possible background. Audio onset detection is well studied [3, 37]. Consequently, we only briefly discuss audio onset hereinbelow where we explain how the measurement function $o^{audio}(t)$ is defined. We further extract binary peaks from $o^{audio}(t)$. Similarly to the visual features, the audio onsets instances are finally summarized by introducing a binary vector $a^{on}$ of length $N_f$ $$a^{on}(t) = \begin{cases} 1 & \text{if an audio onset takes place at time } t \\ 0 & \text{otherwise.} \end{cases} \quad (4.7)$$

Instances in which $a^{on}$ equals 1 are instances in which a new sound begins. Detection of audio onsets is illustrated in FIG. 7, in which dots in the right hand graph point to instances of the left hand graph, a time amplitude plot of a soundtrack, in which a new sound commences in the soundtrack.

A Coincidence-Based Approach

Hereinabove, we showed how visual onsets and audio onsets are extracted from the visual and auditory modalities. Now we describe how the audio onsets are temporally matched to visual onsets. In the specific context of the audio and visual modalities, the choice of audio and visual onsets is not arbitrary. These onsets indeed coincide in many scenarios. For example: the sudden acceleration of a guitar string is accompanied by the beginning of the sound of the string; a sudden deceleration of a hammer hitting a surface is accompanied by noise; the lips of a speaker open as he utters a vowel. One approach for cross-modal association is based on a simple assumption. Consider a pair of significant events (onsets): one event per modality. We assume that if both events coincide in time, then they are possibly related. If such a coincidence re-occurs multiple times for the same feature i, then the likelihood of cross-modal correspondence is high. On the other hand, if there are many temporal mismatches, then the matching likelihood is inhibited. We formulate this principle in the following sections.

General Approach

Let us consider for the moment the correspondence of audio and visual onsets in some ideal cases. If just a single AVO exists in the scene, then ideally, there would be a one-to-one audio-visual temporal correspondence, i.e., $v_i^{on}=a^{on}$ for a unique feature i. Now, suppose there are several independent AVOs, where the onsets of each object i are exclusive, i.e., they do not coincide with those of any other object. Then, $$\sum_{i \in \mathcal{J}} v_i^{on} = a^{on},$$

where J is the set of the indices of the true AVOs. To establish J, one may attempt to find the set of visual features that satisfies Eq. 5.1. However, such ideal cases of perfect correspondence usually do not occur in practice. There are outliers in both modalities, due to clutter and to imperfect detection of onsets, having false positives and negatives. We may detect false audio onsets, which should be overlooked, and on the other hand miss true audio onsets. This is also true for detection of visual onsets in the visual modality.

Thus, we take on a different path to establishing which visual features are associated with the audio. To do this, we take a sequential approach. We define a matching criterion that is based on a probabilistic argument and enables imperfect matching. It favors coincidences, and penalizes for mismatches.

Using a matching likelihood criterion, we sequentially locate the visual features most likely to be associated with the audio. We start by locating the first matching visual feature. We then remove the audio onsets corresponding to it from $a^{on}$. This results in the vector of the residual audio onsets. We then continue to find the next best matching visual feature. This process re-iterates, until a stopping criterion is met.

The next sections are organized as follows. We first derive the matching criterion that quantifies which visual feature has the highest likelihood to be associated with the audio. We then incorporate this criterion in the sequential framework.

Matching Criterion

Here we derive the likelihood of a visual feature i, which has a corresponding visual onsets vector $v_i^{on}$, to be associated to the audio onsets vector aon. Assume that $v_i(t)$ is a random variable which follows the probability law $$Pr[v_i^{on}(t) \mid a^{on}(t)] = \begin{cases} p & , v_i^{on}(t) = a^{on}(t) \\ 1-p & , v_i^{on}(t) \neq a^{on}(t). \end{cases} \quad (5.2)$$

In other words, at each instance, $v_i(t)$ has a probability p to be equal to $a^{on}(t)$, and a (1−p) probability to differ from it.

Assuming that the elements $a^{on}(t)$ are statistically independent of each other, the matching likelihood of a vector $v_i^{on}$ is $$L(i) = \prod_{t=1}^{N_f} Pr[v_i^{on}(t) \mid a^{on}(t)]. \quad (5.3)$$

Denote by $N_{agree}$ the number of time instances in which $a^{on}(t)=v_i^{on}(t)$. From Eqs. (5.2, 5.3), $$L(i)=p^{N_{agree}}\cdot(1-p)^{(N_f-N_{agree})}. \quad (5.4)$$

Both $a^{on}$ and $v_i^{on}$ are binary, hence the number of time instances in which both are 1 is $(a^{on})^T v_i^{on}$. The number of instances in which both are 0 is $(1-a^{on})^T(1-v_i^{on})$, hence $$N_{agree}=(a^{on})^T v_i^{on}+(1-a^{on})^T(1-v_i^{on}). \quad (5.5)$$

Plugging Eq. (5.5) in Eq. (5.4) and re-arranging terms, $$\log[L(i)] = N_f\log(1-p) + [(a^{on})^T v_i^{on} + (1-a^{on})^T(1-v_i^{on})]\log\left(\frac{p}{1-p}\right). \quad (5.6)$$

We seek the feature i whose vector $v_i^{on}$ maximizes L(i). Thus, we eliminate terms that do not depend on $v_i^{on}$. This yields an equivalent objective function of i, $$\tilde{L}(i) = \{2[(a^{on})^T v_i] - 1^T v_i^{on}\}\log\left(\frac{p}{1-p}\right). \quad (5.7)$$

It is reasonable to assume that if feature i is an AVO, then it has more onset coincidences than mismatches. Consequently, we may assume that p>0:5. Hence, $$\log\left(\frac{p}{1-p}\right) > 0.$$

Thus, we may omit the multiplicative term $$\log\left(\frac{p}{1-p}\right)$$

from Eq. (5.7).

We can now finally rewrite the likelihood function as)

$$\tilde{L}(i)=(a^{on})^T v_i^{on}-(1-a^{on})^T v_i^{on}. \quad (5.8)$$

Eq. (5.8) has an intuitive interpretation. Let us begin with the second term. Recall that, by definition, $a^{on}$ equals 1 when an audio onset occurs, and equals 0 otherwise.

Hence, $(1-a^{on})$ is exactly the opposite: it equals 1 when an audio onset does not occur, and equals 0 otherwise. Consequently, the second term of Eq. (5.8) effectively counts the number of the visual onsets of feature i that do not coincide with audio onsets. Notice that since the second term appears with a minus sign in Eq. (5.8), this term acts as a penalty term. On the other hand, the first term counts the number of the visual onsets of feature i that $d_o$ coincide with audio onsets. Eq. (5.8) favors coincidences (which should increase the matching likelihood of a feature), and penalizes inconsistencies (which should inhibit this likelihood). Now we describe how this criterion is embedded in a framework, which sequentially extracts the prominent visual features.

Sequential Matching

Out of all the visual features $i\in[1, N_v]$, $\tilde{L}(i)$ should be maximized by the one corresponding to an AVO. The visual feature that corresponds to the highest value of $\tilde{L}$ is a candidate AVO. Let its index be $\hat{i}$. This candidate is classified as an AVO, if its likelihood $\tilde{L}(\hat{i})$ is above a threshold. Note that by definition, $\tilde{L}(i)\leq\tilde{L}(\hat{i})$ for all i.

Hence, if $\tilde{L}(\hat{i})$ is below the threshold, neither $\hat{i}$ nor any other feature is an AVO.

Figure 8:
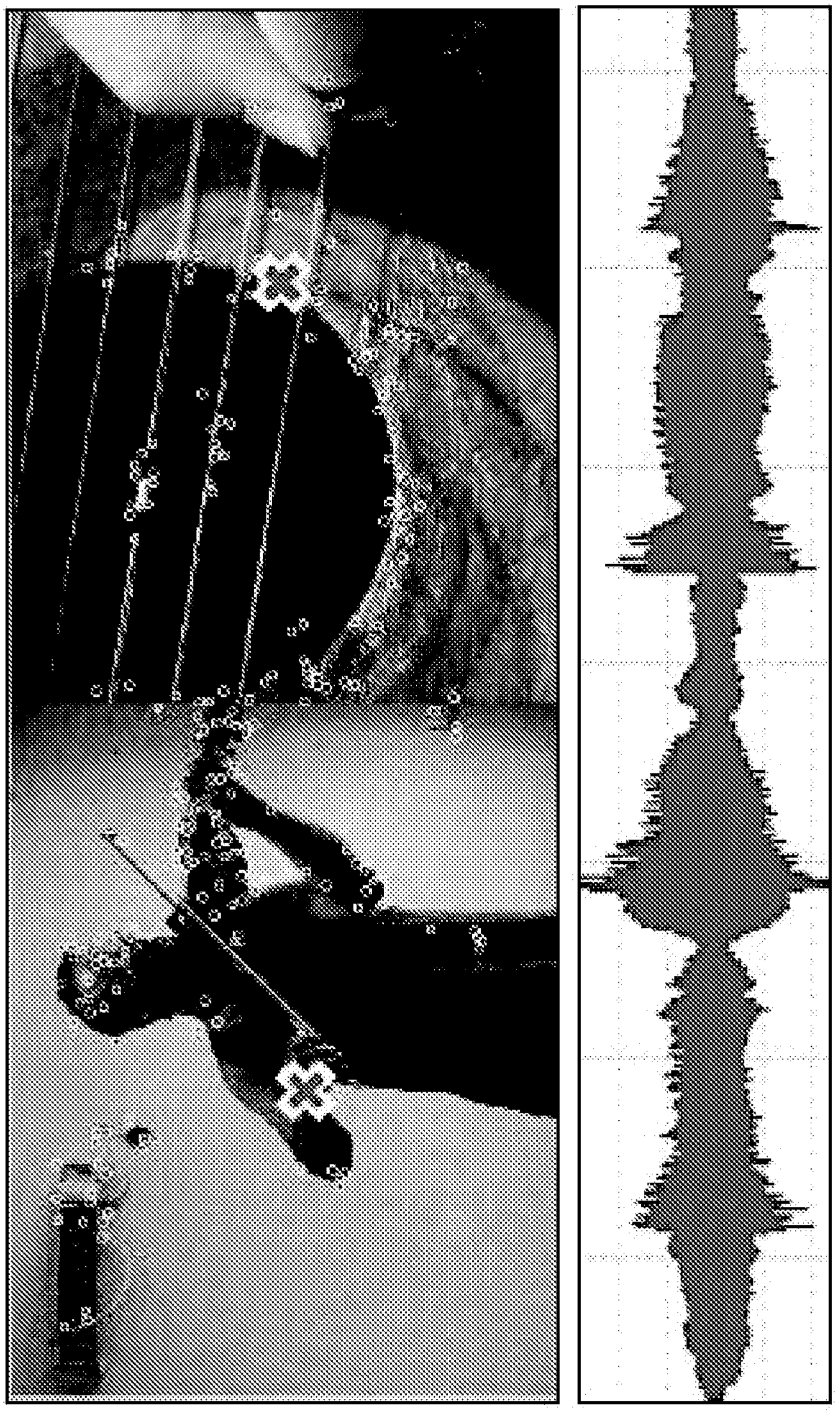
FIG. 8 is a diagram showing how the method of FIGS. 6 and 7 may be applied to two different objects.

At this stage, a major goal has been accomplished. Once feature $\hat{i}$ is classified as an AVO, it indicates audio-visual association not only at onsets, but for the entire trajectory $v_i(t)$, for all t. Hence, it marks a specific tracked feature as an AVO, and this AVO is visually traced continuously throughout the sequence. For example, consider the violin-guitar sequence, one of whose frames is shown in FIG. 8. The sequence was recorded by a simple camcorder and using a single microphone. Onsets were obtained as we describe hereinbelow. Then, the visual feature that maximized Eq. (5.8) was the hand of the violin player. Its detection and tracking were automatic.

Now, the audio onsets that correspond to AVO $\hat{i}$ are given by the vector $$m^{on}=a^{on}\cdot v_{\hat{i}}^{on}, \quad (5.9)$$

where $\cdot$ denotes the logical-AND operation per element. Let us eliminate these corresponding onsets from $a^{on}$. The residual audio onsets are represented by $$a_1^{on}\equiv a^{on}-m^{on}. \quad (5.10)$$

The vector $a_1^{on}$ becomes the input for a new iteration: it is used in Eq. (5.8), instead of $a^{on}$. Consequently, a new candidate AVO is found, this time optimizing the match to the residual audio vector $a_1^{on}$.

This process re-iterates. It stops automatically when a candidate fails to be classified as an AVO. This indicates that the remaining visual features cannot explain the residual audio onset vector. The main parameter in this framework is the mentioned classification threshold of the AVO. We set it to $\tilde{L}(\hat{i})=0$. Using the definition of $\tilde{L}$ from Eq. (5.8) amounts to:

$$0>(a^{on})^T v_i^{on}-(1-a^{on})^T v_i^{on}. \quad (5.11)$$

Rearranging terms yield:

$$(a_i^{on})^T v_i^{on} < \frac{1}{2}1^T v_i^{on}. \quad (5.12)$$

Consequently, when $\tilde{L}(\hat{i})<0$, more than half of the onsets in $v_i^{on}$ are not matched by audio ones. In other words, most of the significant visual events of i are not accompanied by any new sound. We thus interpret this object as not audio-associated.

To recap, our matching algorithm is given in Table 2 (in which 0 is a column vector, all of whose elements are null).

Note that the output $|\hat{\mathcal{J}}|$ accomplishes another goal of this work: the automatic estimation of the number of independent AVOs.

In the violin-guitar sequence mentioned above, this algorithm automatically detected that there are two independent AVOs: the guitar string, and the hand of the violin player (marked as crosses in FIG. 3). Note that in this sequence, the sound and motions of the guitar pose a distraction for the violin, and vice versa. However, the algorithm correctly identified the two AVOs.

TABLE 2

Cross-modal association algorithm.

| | |
|---|---|
| Input: vectors $\{v_i^{on}\}$, $a^{on}$ | |
| 0. | Initalize: $l = 0$, $a_0^{on} = a^{on}$, $m_0^{on} = 0$. |
| 1. | Iterate |
| 2. | $l = l + 1$ |
| 3. | $a_l^{on} = a_{l-1}^{on} - m_{l-1}^{on}$ |
| 4. | $i_l = \mathrm{argmax}_i\{2(a_l^{on})^T v_i^{on} - 1^T v_i^{on}\}$ |
| 5. | If $\left\{(a_l^{on})^T v_{\hat{i}}^{on} \geq \frac{1}{2} 1^T v_{\hat{i}}^{on}\right\}$: then |
| 6. | $m_l^{on} = v_i^{on} \cdot a_l^{on}$ |
| 7. | else |
| 8. | quit |
| Output: | |

The estimated number of independent AVOs is $|\hat{\mathcal{J}}| = l - 1$.
A list of AVOs and corresponding audio onsets vectors $\{i_l, m_l^{on}\}$.

Temporal Resolution

The above discussion derives the theoretical framework for establishing audio-visual association. That framework relies on perfect temporal coincidences between audio and visual onsets: it assumes that an audio onset may be related to a visual onset, if both onsets take place simultaneously (Table 2, step 4). However, in practice, the temporal resolution of the present system is finite. As in any system, the terms coincidence and simultaneous are meaningful only within a tolerance range of time. In the real-world, coincidence of two events at an infinitesimal temporal range has just an infinitesimal probability. Thus, in practice, correspondence between two modalities can be established only up to a finite tolerance range. Our approach is no exception.

Specifically, each onset is determined up to a finite resolution, and audio-visual onset coincidence should be allowed to take place within a finite time window. This limits the temporal resolution of coincidence detection. Let $t_v^{on}$ denote the temporal location of a visual onset. Let $t_a^{on}$ denote the temporal location of an audio onset. Then the visual onset may be related to the audio onset if $$(5.13)|t_v^{on}-t_a^{on}|\leq\delta_1^{AV}. \tag{5.13}$$

In our experiments, we set $\delta_1^{AV}=3$ frames. The frame rate of the video recording is 25 frames/sec. Consequently, an audio onset and a visual onset are considered to be coinciding if the visual onset occurred within 3/25≈⅛ sec of the audio onset.

Disambiguation of the AVO

A consequence of this finite resolution is that several visual features may achieve the maximum matching score to the audio onset vector (Table 2, step 4). Denote this set of visual features by Vcandidates={⟩∞,⟩∊, . . . }. Out of this set of potential candidates we wish to select a single best-matching visual feature. This feature is found as follows. Let i∊Vcandidates. The visual onsets of the visual feature i that have corresponding audio onsets are given by $$V_i^{MATCH}=\{t_v^{on}|m_i^{on}(t_v^{on})=1\}. \tag{5.14}$$

For each visual onset $t_v^{on}\in V_i$MATCH, there is a corresponding audio onset $t_a^{on}$. According to Eq. (5.13), there may be some temporal lag between this pair of audio and visual onsets. The temporal distance between the onsets is defined as $$\Delta^{AV}(t_v^{on}, t_a^{on}) = \begin{cases} 0 & \text{if } |t_v^{on} - t_a^{on}| \leq \delta_2^{AV} \\ |t_v^{on} - t_a^{on}|^2 & \text{else.} \end{cases} \tag{5.15}$$

Figure 9:
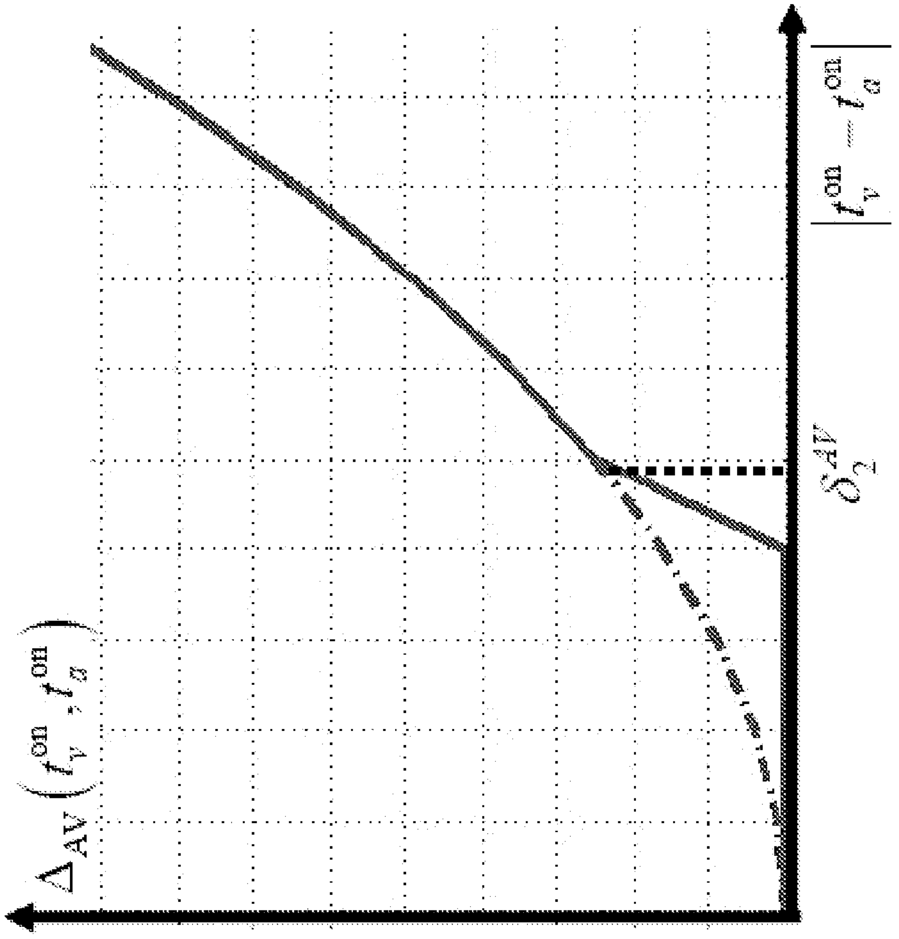
FIG. 9 is a graph illustrating the distance function $\Delta^{AV}(t_v^{on}, t_a^{on})$ between audio and visual onsets, according to an embodiment of the present invention.

This distance function is shown in FIG. 9, and does not penalize for audio and visual onsets whose mutual distance is less than the threshold $\delta_2^{AV}$. For temporal distances exceeding this threshold, the distance is squared. In our experiments, we set $\delta_2^{AV}=2$ frames.

We may now calculate, for a given visual feature i, the average distance of its visual onsets from their corresponding audio onsets:

$$\Delta_i = \frac{\sum_{t_v^{on}\in v_i^{MATCH}} \Delta^{AV}(t_v^{on}, t_a^{on})}{\|V_i^{MATCH}\|}. \tag{5.16}$$

This is simply the mean of distance between the visual onsets and their corresponding audio onsets. Finally, the single best-matching visual feature is established as follows:

$$\hat{i} = \arg\min_{i\in V_{candidates}} \Delta_i. \tag{5.17}$$

Audio Processing and Isolation

In the above we described the procedure to find the visual features that are associated with the audio. This resulted in a set of AVOs, each with its vector of corresponding audio onsets: $\{\hat{i}_l, m_l^{on}\}$. The following describes how the sounds corresponding to each of these AVOs are extracted from the single-microphone soundtrack.

Audio Isolation Method

Out of the soundtrack $s_{mix}$, we wish to isolate the sounds corresponding to a given AVO ^i. To do this, we utilize the audio-visual association achieved. Recall that AVO ^i is associated with the audio onsets in the vector $m^{on}$. In other words, $m^{on}$ points to instances in which a sound associated with the AVO commences. We now need to extract from the mixture only the sounds that begin at these onsets. We may do this sequentially: isolate each distinct sound, and then concatenate all of the sounds together to form the isolated soundtrack of the AVO. How may we isolate a single sound commencing at a given onset instance $t^{on}$? To do this, we need to fit a mask $M^{t^{on}}(t, f)$ that specifies the T-F areas that compose this sound. We may then perform a binary-masking procedure of the kind discussed above.

We assume that frequency bins that have just become active at $t^{on}$, all belong to the commencing sound. In this description, we further focus on harmonic sounds. Since a harmonic sound contains a pitch-frequency and its integer multiples (the harmonies), our task is simplified.

1. We may identify the frequency bins belonging to the commencing sound, simply by detecting the pitch $f_0$ of the sound commencing at $t^{on}$.

2. Since the sound is assumed to be harmonic, we may track the pitch frequency $f_0(t)$ through time.

3. When the sound fades away, at $t^{off}$, the tracking is terminated.

4. This process provides the required mask that corresponds to the desired sound that commences at $t^{on}$:

$$\Gamma_{desired}^{t^{on}}(t,f)=\{(t,f_0(t)k)\},\text{ where } t\in[t^{on},t^{off}] \text{ and } k\in[1\ldots K], \tag{6.1}$$

K being the number of considered harmonies. Eq. (6.1) states that an harmonic sound commencing at $t^{on}$ is composed from the integer multiplies of the pitch frequency, and this frequency changes through time.

To conclude: given only an onset instance $t^{on}$, we determine $\Gamma_{desired}^{t^{on}}$ by detecting $f_0(t^{on})$, and then tracking $f_0(t)$ in $t\in[t^{on}; t^{off}]$.

Exploiting harmonicity for single-microphone source-separation is not new [10]. In contrast to previous methods, however, we do not assume that we have knowledge about the number of interferences, about the pitch-frequency of the interfering sounds, or about the pitch-frequency of the sound of interest in past or future instances. Consequently, our task in step-1 is a novel one: given only an onset instance of a sound, extract $f_0(t^{on})$. This is described next.

Pitch Detection at Onset Instances

Pitch-detection of single and of multiple mixed sounds is a highly studied field [10]. However, most methods that extract the pitch of multiple concurrent sources require knowledge about the nature of the interfering sounds, or the number of the concurrent sources. We assume that we do not have such information. Our task is formulated as following.

Given an onset instance $t^{on}$, extract $f_0(t^{on})$, the pitch frequency of the commencing signal, while disregarding interferences of other sounds. We extract $f0(t^{on})$ from the STFT-amplitude of the mixture Amix(t, f). To do this, we first need to remove the audio components of the interferences from Amix(t, f).

Elimination of Prior Sounds

The sound of interest is the one commencing at $t^{on}$. Thus, the disturbing audio at $t^{on}$ is assumed by us to have commenced prior to $t^{on}$. These disturbing sounds linger from the past. Hence, they can be eliminated by comparing the audio components at $t=t^{on}$ to those at $t<t^{on}$, particularly at $t=t^{on}-1$. Specifically, Ref. [37] suggests the relative temporal difference $$D(t,f)=\frac{A(t,f)-A(t-1,f)}{A(t-1,f)}. \tag{6.2}$$

Eq. (6.2) emphasizes an increase of amplitude in frequency bins that have been quiet (no sound) just before t.

Figure 10:
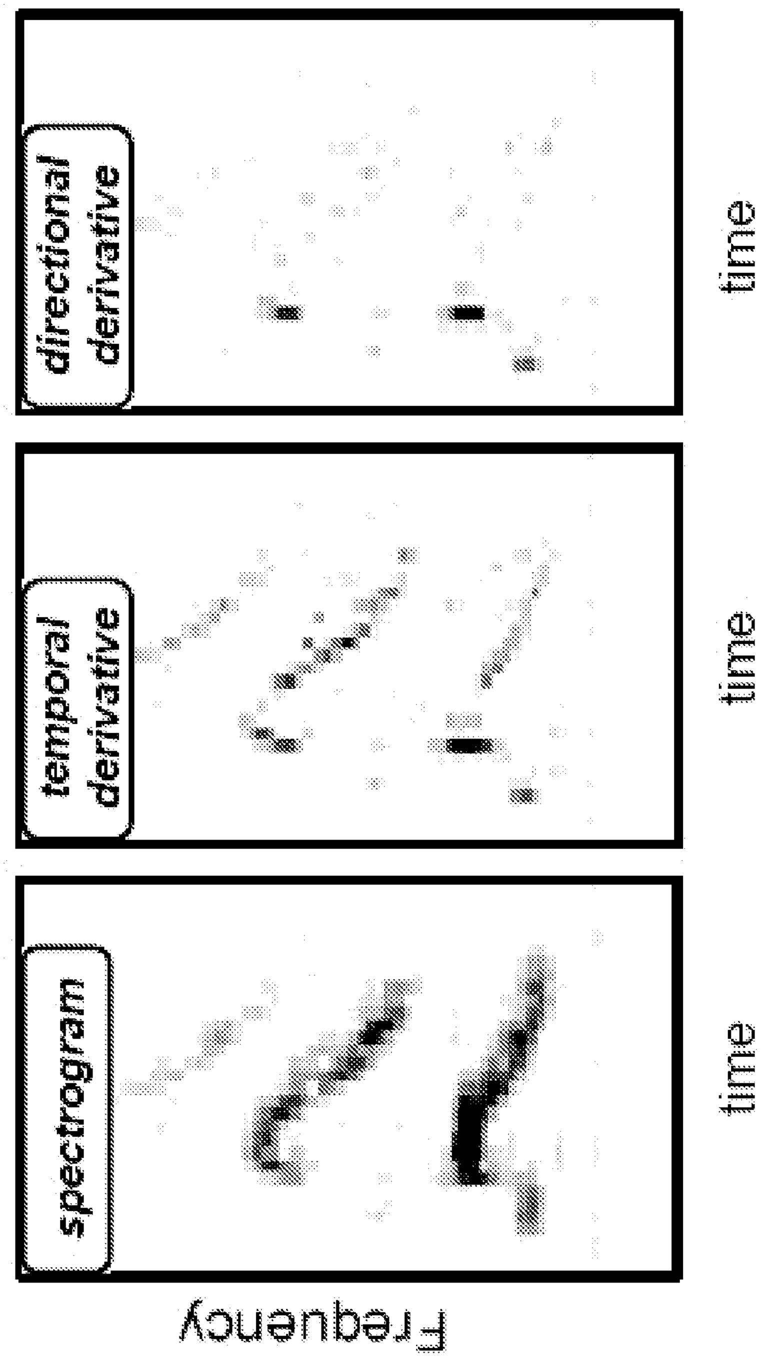
FIG. 10 shows three graphs side by side, of a spectrogram, a temporal derivative and a directional derivative.

As a practical criterion, however, Eq. (6.2) is not robust. The reason is that sounds which have commenced prior to t may have a slow frequency drift. The point is illustrated in FIG. 10. This poses a problem for Eq. (6.2), which is based solely on a temporal comparison per frequency channel. Drift results in high values of Eq. (6.2) in some frequencies f, even if no new sound actually commences around (t, f), as seen in FIG. 10. This hinders the emphasis of commencing frequencies, which is the goal of Eq. (6.2). To overcome this, we compute a directional difference in the time-frequency (spectrogram) domain. It fits neighboring bands at each instance, hence tracking the drift. Consider a small frequency range $\Omega_{freq}(f)$ around f. In analogy to image alignment, frequency alignment at time t is obtained by $$f^{aligned}(f)=\arg\min_{f_z\in\Omega_{freq}(f)}|A_{mix}(t^{on},f)-A_{mix}(t^{on}-1,f_z)|. \tag{6.3}$$

Then, f aligned at t−1 corresponds to f at t, partially correcting the drift. The map $$\tilde{D}(t,f)=\frac{A_{mix}(t,f)-A_{mix}(t-1,f^{aligned}(f))}{A_{mix}(t-1,f^{aligned}(f))} \tag{6.4}$$

is indeed much less sensitive to drift, and is responsive to true onsets. Reference is made in this connection to FIG. 10, which shows the effect of frequency drift on the STFT temporal derivative. In this figure the left hand graph is a spectrogram of a female speaker evincing a high frequency drift. A temporal derivative, center graph, results in high values through the entire sound duration, due to the drift even though start of speech only occurs once, at the beginning. The right hand graph shows a directional derivative and correctly shows high values at the onset only.

The map $$\tilde{D}_+(t,f)=\max\{0,\tilde{D}(t,f)\} \tag{6.5}$$

maintains the onset response, while ignoring amplitude decrease caused by fade-outs.

Pitch Detection at $t^{on}$

As described in the previous section, the measure $\tilde{D}_+(t^{on}, f)$ emphasizes the amplitude of frequency bins that correspond to a commencing sound. To detect the pitch frequency at $t^{on}$, we use $\tilde{D}_+(t^{on}, f)$ as the input to to Eq. (3.7), as described hereinabove:

$$\hat{f}_0(t^{on})=\underset{f}{\operatorname{argmax}}\sum_{k=1}^{K}\tilde{D}_+(t^{on},f\cdot k). \tag{6.6}$$

Figure 11:
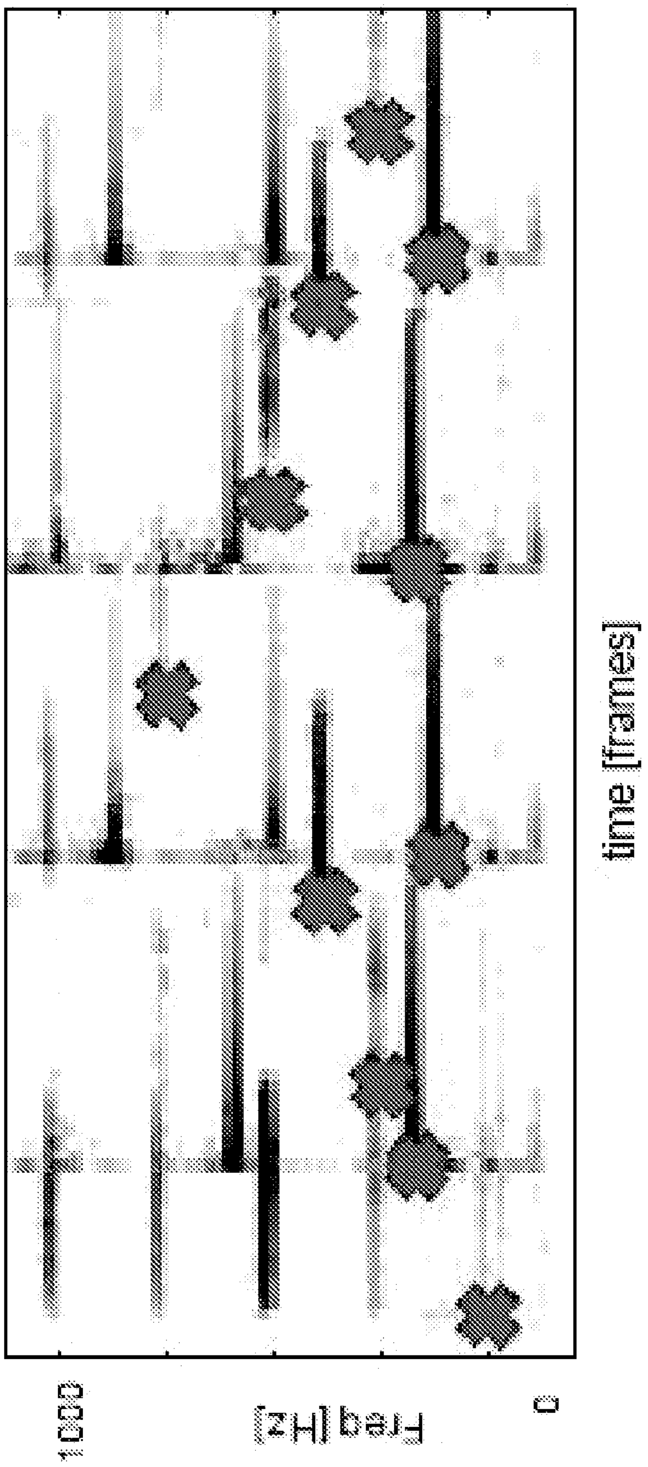
FIG. 11 is a simplified diagram showing instances with pitch of the occurrence of audio onsets.

An example for the detected pitch-frequencies at audio onsets in the violin-guitar sequence is given in FIG. 11. FIG. 11 is a frequency v. time graph of the STFT amplitude corresponding to a violin-guitar sequence. The horizontal position of overlaid crosses indicates instances of audio onsets. The vertical position of the crosses indicates the pitch frequency of the commencing sounds.

Following the detection of $f_0(t^{on})$, the pitch-frequency needs to be tracked during $t\geq t^{on}$, until $t^{off}$. This procedure is described next.

Pitch Tracking

In the above we described how the pitch frequency $f_0(t^{on})$ of a sound commencing at $t^{on}$ is detected. We now describe how we track $f_0(t)$ through time, and how the instance of its termination $t^{off}$ is established.

Given the detected pitch frequency at $f_0(t)$, we wish to establish $f_0(t+1)$. It is assumed to lie in a frequency neighborhood $\Omega_{freq}$ of $f_0(t)$, since the pitch frequency of a source typically evolves gradually [10]. Recall that an harmonic sound contains multiples of the pitch frequency (the harmonies). Let the set of indices of active harmonies at time t be K(t). For initialization we set $K(t^{on})=[1, \ldots, K]$. The estimated frequency $f_0(t)$ may be found as the one whose harmonies capture most of the energy of the signal $f_0(t+1)=$arg max $$f_0(t+1) = \arg\max_{f \in \Omega_{freq}} \sum_{k \in \mathcal{K}(t)} \|A_{mix}(t+1, f \cdot k)\|^2; \quad (6.7)$$

where Amix(t,f) was defined in Eq. (3.2).

Eq. (6.7), however, does not account for the simultaneous existence of other audio sources. Disrupting sounds of high energy may be present around the harmonies (t+1, f·k) for some $f \in \Omega_{freq}$, and $k \in K(t)$. This may distort the detection of $f_0(t+1)$. To reduce the effect of these sounds, we do not use the amplitude of the harmonies Amix(t+1, f·k) in Eq. (6.7). Rather, we use log $[A_{mix}(t+1, f \cdot k)]$. This resembles the approach taken by the HPS algorithm discussed above for dealing with noisy frequency components. Consequently, the estimation of $f_0(t+1)$ is more effectively dependent on many weak frequency bins. This significantly reduces the error induced by a few noisy components.

Recall that the pitch is tracked in order to identify the set $\Gamma_{desired}^{t^{on}}$ of time-frequency bins in which an harmonic sound lies. We now go into the details of how to establish $\Gamma_{desired}^{t^{on}}$. According to Eq. (6.1), $\Gamma_{desired}^{t^{on}}$ should contain all of the harmonies of the pitch frequency, for $t \in [t^{on}; t^{off}]$. However, $\Gamma_{desired}^{t^{on}}$ may also contain unwanted interferences. Therefore, once we identify the existence of a strong interference at a harmony, we remove this harmony from K(t). This implies that we prefer to minimize interferences in the enhanced signal, even at the cost of losing part of the acoustic energy of the signal. A harmony is removed from K(t) also if the harmony faded out: we assume that it will not become active again. Both of these mechanisms of harmony removal are identified by inspecting the following measure:

$$\rho(k, t) = \frac{A_{mix}[t+1, f_0(t+1) \cdot k]}{A_{mix}[t, f_0(t) \cdot k]}. \quad (6.8)$$

The measure ρ(k, t) inspects the relative temporal change of the harmony's amplitude. Let ρinterfer and ρdead be two positive constants. When $\rho(k, t) \geq \rho_{interfer}$ we deduce that an interfering signal has entered the harmony k. Therefore, it is removed from K(t). Similarly, when $\rho(k; t) \leq \rho_{dead}$ we deduce that the harmony k has faded out. Therefore, it is removed from K(t). Typically we used $\rho_{interfer}=2.5$ and $\rho_{dead}=0.5$.

We initialize the tracking process with $f0(t^{on})$ and $K(t^{on})=[1, \ldots, K]$, and iterate it through time. When the number of active harmonies |K(t)| drops below a certain threshold $K_{min}$, termination of the signal at time $t^{off}$ is declared. Typically we used $K_{min}=3$. The domain $\Gamma_{desired}^{t^{on}}$ that the tracked sound occupies in $t \in [t^{on}; t^{off}]$ is composed from the active harmonies at each instance t. Formally:

$$\Gamma_{desired}^{t^{on}} = \{(t, f_0(t) \cdot k\}, \text{ where } t \in [t^{on}, t^{off}] \text{ and } k \in [1 \ldots K], \quad (6.9)$$

where $t \in [t^{on}; t^{off}]$ and $k \in K(t)$. The tracking process is summarized in Table 3.

TABLE 3

| Pitch Tracking Algorithm | |
|---|---|
| Input: $t^{on}$, $f_0(t^{on})$, $A_{mix}(t, f)$ | |
| 0. | Initialize: $t = t^{on}$, $\mathcal{K}(t) = [1, \ldots, K]$. |
| 1. | Iterate |
| 2. | $f_0(t+1) = \text{argmax}_{f \in \Omega_{freq}} \Sigma_{k \in \mathcal{K}(t)} \|\|\log[A_{mix}(t+1, f \cdot k)]\|\|^2$ |

TABLE 3-continued

| Pitch Tracking Algorithm | |
|---|---|
| 3. | foreach $k \in \mathcal{K}(t)$ |
| 4. | $\rho(k, t) = \frac{A_{mix}[t+1, f_0(t+1) \cdot k]}{A_{mix}[t, f_0(t) \cdot k]}$ |
| 5. | if $\rho(k, t) \geq \rho_{interfer}$ or $\rho(k, t) \leq \rho_{dead}$ then |
| 6. | $\mathcal{K}(t) = \mathcal{K}(t-1) - k$ |
| 7. | end foreach |
| 8. | if $\|K(t)\| < K_{min}$ then |
| 9. | $t^{off} = t$ |
| 10. | quit |
| 11. | $t = t + 1$ |
| Output: | |
| The offset instance of the tracked sound $t^{off}$. | |
| The pitch frequeny $f_0(t)$, for $t \in [t^{on}, t^{off}]$ | |
| The indices of active harmonies $\mathcal{K}(t)$, for $t \in [t^{on}, t^{off}]$ | |
| The T-F domain $\Gamma_{desired}^{t^{on}}$ of the tracked sound: | |
| $\Gamma_{desired}^{t^{on}} = \{(t, f_0(t) \cdot k\}$, for $k \in \mathcal{K}(t)$, $t \in [t^{on}, t^{off}]$ | |

Detection of Audio Onsets

In this section we briefly review the method used to extract audio onsets. Methods for audio-onset detection have been extensively studied [3]. Here we describe our particular method for onsets detection. Our criterion for significant signal increase is simply $$o^{audio}(t) = \sum_f \tilde{D}_+(t, f). \quad (6.10)$$

where $\tilde{D}_+(t, f)$ is defined in Eq. (6.5). The criterion is similar to a criterion first suggested in Ref. [37], which was used to detect the onset of a single sound, rather than several mixed sounds. However, the criterion we use is more robust in the setup of several mixed sources, as it suppresses lingering sounds (Eq. 6.5).

In order to extract the discrete instances of audio onsets from Eq. (6.10), we perform the following. The measure $o^{audio}(t)$ is normalized to the range [0, 1] by setting $$\hat{o}^{audio}(t) = \frac{o^{audio}(t)}{\max_t o^{audio}(t)}$$

Then $\hat{o}^{audio}(t)$ goes through an adaptive thresholding process, which is explained hereinbelow.

The discrete peaks extracted from $\hat{o}^{audio}(t)$ are then the desired audio onsets.

EXPERIMENTS

In the following we present experiments based on real recorded video sequences. We first describe the experiments and the association results. The following section provides a quantitative evaluation of the audio isolation for some of the analyzed scenes. This is followed by implementation details, and typical parameter values.

Results

Figure 12:
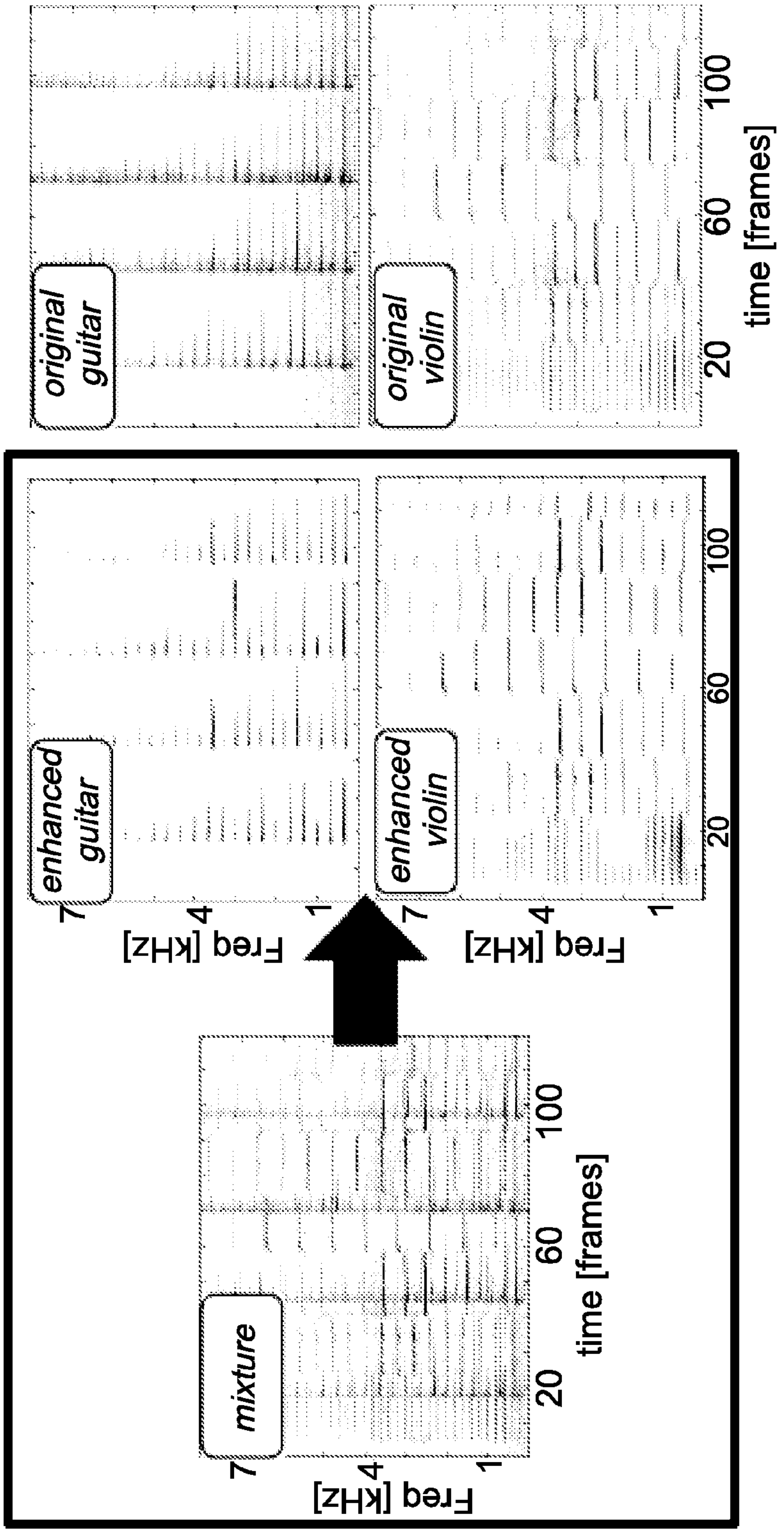
FIG. 12 shows the results of enhancing the guitar and violin from a mixed track using the present embodiments, compared with original tracks of the guitar and violin.

In this section we detail experiments based on real video sequences. A first clip used was a violin-guitar sequence. This sequence features a close-up on a hand playing a guitar. At the same time, a violinist is playing. The soundtrack thus contains temporally-overlapping sounds. The algorithm automatically detected that there are two (and only two) independent visual features that are associated with this soundtrack. The first feature corresponds to the violinist's hand. The second is the correct string of the guitar, see FIG. 8 above. Following the location of the visual features, the audio components corresponding to each of the features are extracted from the soundtrack. The resulting spectrograms are shown in FIG. 12, to which reference is now made. In FIG. 12, spectrograms are shown which correspond to the violin guitar sequence. Darker points in each plot indicate points of high energy content, as a function of time and frequency. Based on visual data, the audio components of the violin and guitar were automatically separated from a soundtrack, which had been recorded by a single microphone. The leftmost plot is the soundtrack with the mixed signal. The two central plots are the sounds as separated by the present embodiments and the rightmost plots are original separate guitar and violin recordings for comparison. As can be seen the central plots closely resemble the rightmost plots in each case, indicating a high degree of success.

Figure 13:
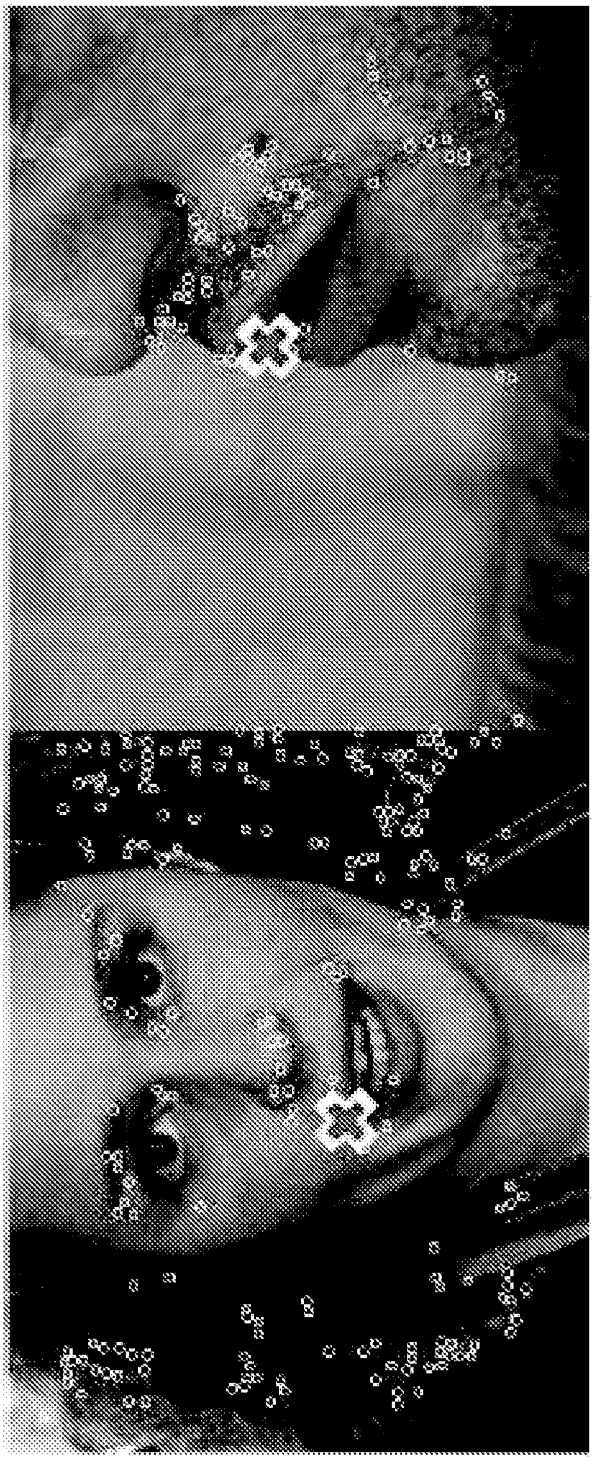
FIG. 13 illustrates the selection of objects in the first male and female speakers experiment.
Figure 14:
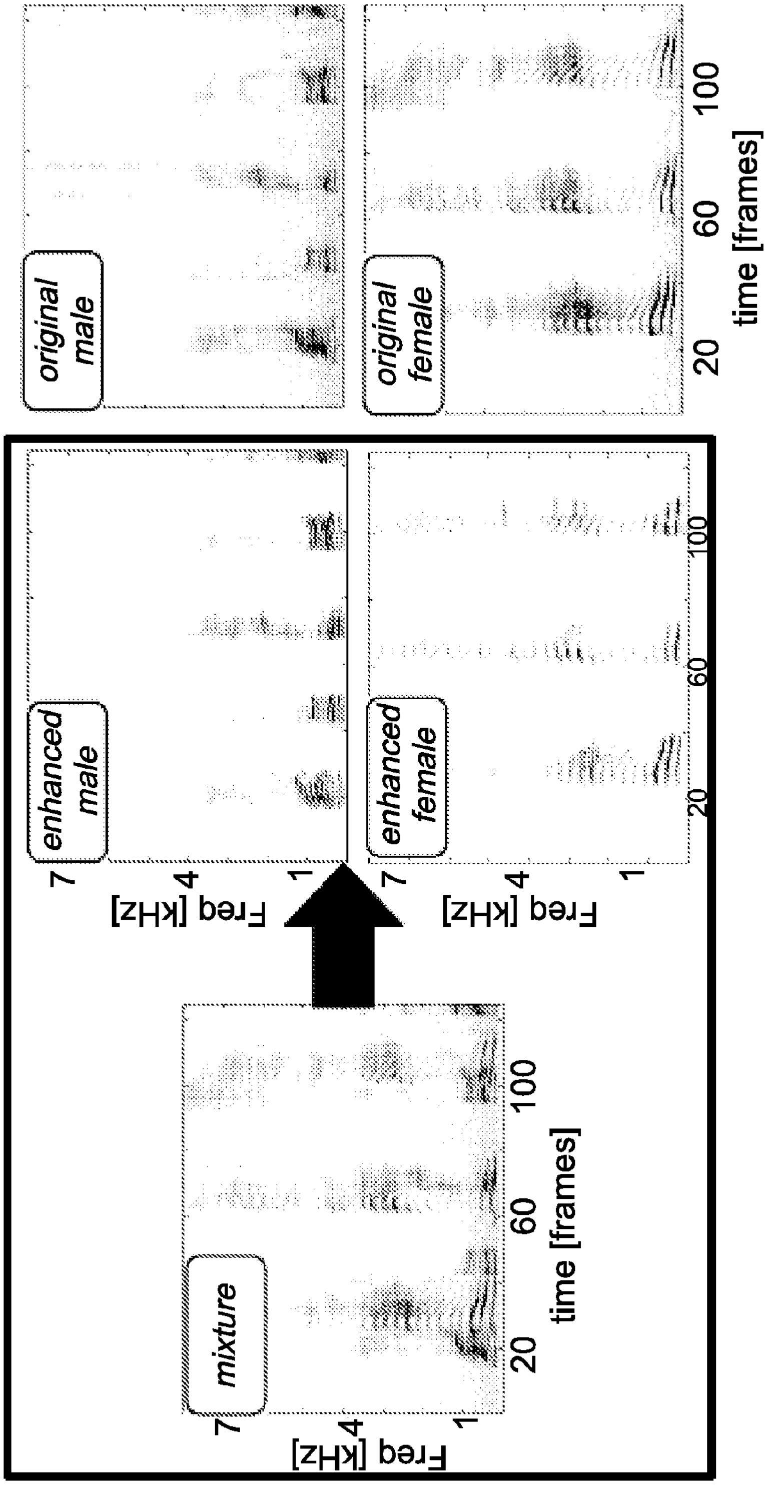
FIG. 14 illustrates the results of the first male and female speakers experiment.

Another sequence used is referred to herein as the speakers #1 sequence. This movie has simultaneous speech by a male and a female speaker. The female is videoed frontally, while the male is videoed from the side. The algorithm automatically detected that there are two visual features that are associated with this soundtrack. They are marked in FIG. 13 by crosses. Following the location of the visual features, the audio components corresponding to each of the speakers are extracted from the soundtrack. The resulting spectrograms are shown in FIG. 14, which is the equivalent of FIG. 12. As can be seen, there is indeed a significant temporal overlap between independent sources. Yet, the sources are separated successfully.

Figure 15:
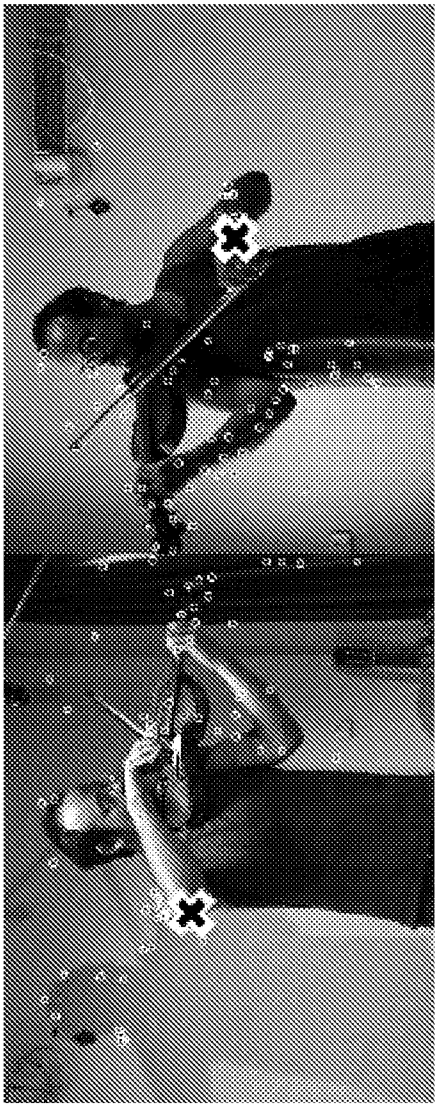
FIG. 15 illustrates the selection of objects in the two violins experiment.
Figure 16:
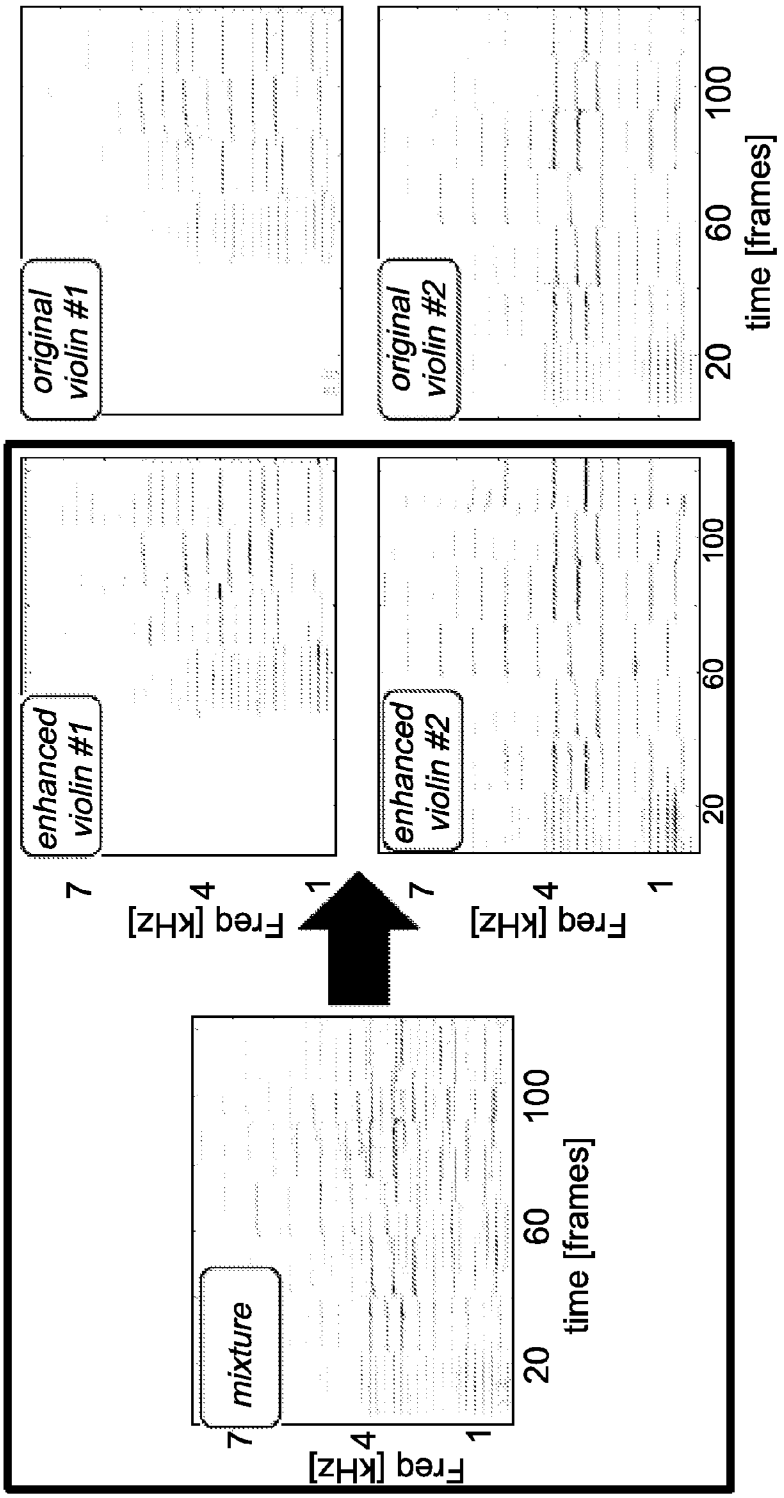
FIG. 16 illustrates the results of the two violins experiment.

The next experiment was the dual-violin sequence, a very challenging experiment. It contains two instances of the same violinist, who uses the same violin to play different tunes. Human listeners who had observed the scene found it difficult to correctly group the different notes into a coherent tune. However, our algorithm is able to correctly do so. First, it locates the relevant visual features (FIG. 15). These are exploited for isolating the correct audio components; the log spectrograms are shown in FIG. 16. This example demonstrates a problem which is very difficult to solve with audio data alone, but is elegantly solved using the visual modality.

Audio Isolation: Quantitative Evaluation

In this section we provide quantitative evaluation for the experimental separation of the audio sources. These measures are taken from Ref. [69]. They are aimed at evaluating the overall quality of a single-microphone source-separation method. The measures used are the preserved-signal-ratio (PSR), and the signal-to-interference-ratio (SIR), which is measured in Decibels. For a given source, the PSR quantifies the relative part of the sound's energy that was preserved during the audio isolation.

The SIR of an isolated source is compared to the SIR of the mixed source. Further details about these measures are given Hereinbelow. Table 4 summarizes the quality measures for the conducted experiments. The PSR numbers are relatively high: most of the energy of the sources was well preserved. The only exception is the female in the speakers #1 sequence. She loses almost half of her energy in the isolation process. However, her isolated speech is still very intelligible, since the informative parts of her speech were well preserved.

TABLE 4

Quantitative evaluation of the audio isolation.

| sequence | source | PSR | SIR improvement [dB] |
|---|---|---|---|
| violin-guitar | violin | 0.89 | 13 |
| | guitar | 0.78 | 4.5 |
| speakers | male | 0.64 | 12 |
| | female | 0.51 | 16 |
| dual-violin | violin1 | 0.67 | 10 |
| | violin2 | 0.89 | 18.5 |

The SIR improvements of the sources is quite dramatic. The only exception is the guitar in the violin-guitar sequence, for which the SIR improvement is moderate. The reason for this moderation is that some of the T-F components of the violin were erroneously included in the binary mask corresponding to the guitar. Consequently, the isolated soundtrack of the guitar contains artifacts traced to the violin.

Implementation Details

This section describes the implementation details of the algorithm described in this thesis. It also lists the parameter values used in the implementation. Unless stated otherwise, the parameters required tuning for each analyzed sequence.

Temporal Tolerance

Audio and visual onsets need not happen at the exact same frame. As explained above, an audio onset and visual onsets are considered simultaneous, if they occur within 3 frames from one another.

Frequency Analysis

In all of the experiments, the audio is re-sampled to 16 kHz. It is analyzed using a Hamming window of 80 msec, equivalent to $N_w$=1280. Our use of $M=N_w/2$ (50% overlap) ensured synchronicity of the windows with the video frame rate (25 Hz).

Audio Onsets

The function $o^{audio}(t)$ described hereinabove is adaptively thresholded. The adaptive thresholding parameters given hereinbelow are set to typical values of $\delta_{fixed}=1$, $\delta_{adaptive}=0.5$, and $\Omega_{time}=4$. For pitch detection and tracking, the number of considered harmonies is set to K=10. Detection of pitch-halving is performed as described hereinabove. Typically, $\delta_{half}=0.9$.

Visual Processing

Prior to calculating $\ddot{v}_i(t)$ as described hereinabove, the trajectory $v_i(t)$ is filtered to remove tracking noise. The temporal filtering is performed separately on each of the vector components $v_i(t)=[x_i(t), y_i(t)]^T$. This means that $x_i(t)$ and $y_i(t)$ are separately filtered. The filtering process consists of performing temporal median filtering to account for abrupt tracking errors. The median window is typically set in the range between 3 to 7 frames. Consequent filtering consists of smoothing by convolution with a Gaussian kernel of standard deviation $\rho_{visual}$. Typically, $\rho_{visual} \in [0.5, 1.5]$. Finally, the adaptive threshold parameters, see below are tuned in each analyzed scene. Typical thresholding values are $\delta_{fixed}=0$, $\delta_{adaptive}=0.5$, and $\Omega_{time}=8$. We further remove visual onsets whose amplitudes of acceleration and velocity are smaller than specific values. Typically in our experiments, the velocity and acceleration amplitudes at an instance of a visual onset should exceed the values of 0.2.

Visual Pruning.

An algorithm according to the above tested embodiment groups audio onsets based on vision only. The temporal resolution of the audio-visual association is also limited. This implies that in a dense audio scene, any visual onset has a high probability of being matched by an audio onset. To avoid such an erroneous audio-visual association, it is possible to aggressively prune visual onsets. For example two onsets of a visual feature may not be accepted if closer than 10 frames to each other. This is equivalent to assuming an average event rate of 2:5 Hz. This has the advantage of making dense scenes easier to handle but limits the applicability of our current realization in the case of rapidly-moving AVOs.

Further Extensions

Audio-visual association. To avoid associating audio onsets with incorrect visual onsets, one may exploit the audio data better. This may be achieved by performing a consistency check, to make sure that sounds grouped together indeed belong together. Outliers may be detected by comparing different characteristics of the audio onsets. This would also alleviate the need to aggressively prune the visual onsets of a feature. Such a framework may also lead to automatically setting of parameters for a given scene. The reason is that a different set of parameter values would lead to a different visual-based auditory-grouping. Parameters resulting in consistent groups of sounds (having a small number of outliers) would then be chosen.

Single-microphone audio-enhancement methods are generally based on training on specific classes of sources, particularly speech and typical potential disturbances [57]. Such methods may succeed in enhancing continuous sounds, but may fail to group discontinuous sounds correctly to a single stream. This is the case when the audio-characteristics of the different sources are similar to one another. For instance, two speakers may have close-by pitch-frequencies. In such a setting, the visual data becomes very helpful, as it provides a complementary cue for grouping of discontinuous sounds. Consequently, incorporating our approach with traditional audio separation methods may prove to be worthy. The dual violin sequence above exemplifies this. The correct sounds are grouped together according to the audio-visual association.

Cross-Modal Association. This work described a framework for associating audio and visual data. The association relies on the fact that a prominent event in one modality is bound to be noticed in the other modality as well. This co-occurrence of prominent events may be exploited in other multi-modal research fields, such as weather forecasting and economic analysis.

Tracking of Visual Features

The algorithm used in the present embodiment is based on tracking of visual features throughout the analyzed video sequence, based on Ref. [5].

Adaptive Thresholds

We now describe the adaptive threshold functions used in the detection of the audio and the visual onsets. Given a measure o(t), the goal is to extract discrete instances in which o(t) has a local maximum. These instances should correspond to meaningful instances, and contain as few as possible nuisance events. Part of the description below is based on Ref. [3].

Fixed thresholding methods define significant events by peaks in the detection function that exceed a threshold $$o(t)>\delta_{fixed}. \tag{B.1}$$

Here $\delta_{fixed}$ is a positive constant. This approach may be successful with signals that have little dynamics. However, each of the sounds in the recorded soundtrack may exhibit significant loudness changes. In such situations, a fixed threshold tends to miss onsets corresponding to relatively quiet sounds, while over-detecting the loud ones. For the visual modality, the same is also true. A motion path may include very abrupt changes in motion, but also some more subtle ones. In these cases, the measure o(t) spreads across a high range of values. For this reason, some adaptation of the threshold is required. We augment the fixed threshold with an adaptive nonlinear part. The adaptive threshold inspects the temporal neighborhood of o(t). This is similar in spirit to spatial reasoning in image edge-detection discussed above.

Given a time instance t, define a temporal neighborhood of it:

$$\Omega_{time}(\omega)=[t-\omega, \ldots, t+\omega]. \tag{B.2}$$

Here ω is an integer number of frames. In audio, we may expect that $o^{audio}(t^{on})$ would be larger than the measure $o^{audio}(t)$ in other $t\in\Omega_{time}(\omega)$. Consequently, following Ref. [3], we set $$\tilde{\delta}_{audio}=\delta_{fixed}+\delta_{adaptive}\cdot\text{median}_{t\in\Omega_{time}(\omega)}\{o^{audio}(t)\} \tag{B.3}$$

Here the median operation may be interpreted as a robust estimation of the average of $o^{audio}(t)$ around $t^{on}$. By using the median operation, Eq. (B.3) enables the detection of close-by audio onsets that are expected in the single-microphone soundtrack.

In the video, we take a slightly different approach. We take $$\tilde{\delta}_{video}=\delta_{fixed}+\delta_{adaptive}\cdot\max_{t\in\Omega_{time}(\omega)}\{o^{video}(t)\}, \tag{B.4}$$

where the median of Eq. (B.3) is replaced by the max operation. Unlike audio, the motion of a visual feature is assumed to be regular, without frequent strong variations. Therefore, two strong temporal variations should not be close-by. Consequently, it is not enough for o(t) to exceed the local average. It should exceed a local maximum. Therefore the median is replaced by the max.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus for cross-modal association of events from a complex source having at least a first and a second modality, multiple objects, and events, the apparatus comprising:

an input for receiving first data from a first recording device, said first data relating to said first modality;

an input for receiving second data from a second recording device, said second data relating to said second modality;

an associator configured for iteratively associating event-related changes recorded in said first mode and event-related changes recorded in said second mode according to a predetermined maximum likelihood criterion, said likelihood criterion, over said iteration, obtaining a score for respective event related changes in said first mode and reinforcing respective associations where event related changes are repeated and reducing respective associations where event related changes are not repeated, said associator configured to provide an association between events belonging to said changes using a result of said iteration, by selecting a best score, thereby not pregrouping said event-related changes into different coherent groups expected to repeat themselves;

a first output connected to said associator, configured to indicate ones of the multiple objects in the second modality being associated with respective ones of the multiple events in the first modality.

2. The apparatus of claim 1, wherein said event-related change is any one of the group comprising a maximum rate of acceleration, and an onset.

3. The apparatus of claim 1, wherein said associator is configured to make said association based on respective timings of said onsets.

4. The apparatus of claim 1, further comprising a second output associated with said first output configured to group together events in the first modality that are all associated with a selected object in the second modality; thereby to isolate a stream associated with said object.

5. The apparatus of claim 1, wherein said first modality is an audio mode and said first recording device is one or more microphones, and said second modality is a visual mode, and said second recording device is one or more cameras.

6. The apparatus of claim 1, further comprising event change detectors placed between respective recording devices and said associator, to provide event change indications for use by said associator.

7. The apparatus of claim 1, wherein said maximum likelihood detector is configured to refine said likelihood based on repeated occurrences of said given event in said second modality.

8. The apparatus of claim 7, wherein said maximum likelihood detector is configured to calculate a confirmation likelihood based on association of said event in said second modality with repeated occurrence of said event in said first mode.

9. Method for isolation of a media stream for respected detected objects of a first modality from a complex media source having at least two media modalities, multiple objects, and events, the method comprising:

obtaining first data of said first modality;

obtaining second data of a second modality;

detecting events and respective changes of said events;

iteratively associating between events recorded in said first modality and events recorded in said second modality according to a predetermined maximum likelihood criterion, said associating comprising obtaining a score for respective event related changes in said first mode based at least partly on timings of respective changes and providing an association output using a best score result of said iteration, said maximum likelihood criterion, over said iteration, reinforcing respective associations where event related changes are repeated and reducing respective associations where event related changes are not repeated, said scoring using said predetermined maximum likelihood criterion thereby obviating a need for pregrouping said event-related changes into different coherent groups expected to repeat themselves; and isolating those events in said first modality associated with events in said second modality associated with a predetermined object, thereby to isolate an isolated media stream associated with said predetermined object.

10. The method of claim 9, wherein said first modality is an audio modality, and said second modality is a visual modality.

11. The method of claim 9, providing event change indications for use in said association.

12. The method of claim 11, wherein said maximum likelihood criterion comprises calculating a likelihood that a given event in said first modality is associated with a given event of a specific object in said second modality.

13. The method of claim 12, wherein said maximum likelihood criterion further comprises refining said likelihood based on repeated occurrences of said given event in said second modality.

14. The method of claim 13, wherein said maximum likelihood criterion further comprises calculating a confirmation likelihood based on association of said event in said second modality with repeated occurrence of said event in said first modality.

* * * * *